(12) United States Patent
Graham

(10) Patent No.: US 7,497,981 B2
(45) Date of Patent: Mar. 3, 2009

(54) COMPOSITE AND METAL COMPONENT PRODUCTION, FORMING AND BONDING SYSTEM

(75) Inventor: Neil Graham, Canning Vale (AU)

(73) Assignee: Quickstep Technology Pty Ltd., Canning Vale (AU)

( * ) Notice: Subject to any disclaimer, the term of this patent is extended or adjusted under 35 U.S.C. 154(b) by 649 days.

(21) Appl. No.: 10/466,288

(22) PCT Filed: Jan. 25, 2002

(86) PCT No.: PCT/AU02/00078

§ 371 (c)(1),
(2), (4) Date: Jan. 23, 2004

(87) PCT Pub. No.: WO02/058916

PCT Pub. Date: Aug. 1, 2002

(65) Prior Publication Data

US 2004/0113315 A1    Jun. 17, 2004

(30) Foreign Application Priority Data

Jan. 25, 2001    (AU)    ..................... PR2707
Apr. 20, 2001    (AU)    ..................... PR4520

(51) Int. Cl.
*B29C 43/02*    (2006.01)
*B29C 43/20*    (2006.01)

(52) U.S. Cl. ............ 264/266; 264/314; 264/553; 264/297.5; 425/128; 425/111; 425/389; 425/388

(58) Field of Classification Search .......... None
See application file for complete search history.

(56) References Cited

U.S. PATENT DOCUMENTS

| | | | |
|---|---|---|---|
| 1,806,861 A | 5/1931 | Owen | |
| 1,872,692 A | 8/1932 | Drake | |
| 2,519,661 A | 8/1950 | Johnson | |
| 2,565,952 A | 8/1951 | Curran et al. | |
| 3,580,795 A | 5/1971 | Eichenlaub | |
| 3,964,958 A | 6/1976 | Johnston | |
| 4,190,205 A | 2/1980 | Mitchell | ..................... 239/129 |
| 4,842,663 A | 6/1989 | Kramer | |
| 4,892,599 A | 1/1990 | Marwick | |

(Continued)

FOREIGN PATENT DOCUMENTS

AU    697678    3/1996

(Continued)

*Primary Examiner*—Edmund H. Lee
(74) *Attorney, Agent, or Firm*—Baker & Daniels LLP

(57) ABSTRACT

A system for producing composite or bonded metal components including: first and second pressure chambers, each pressure chamber having an elastically deformable chamber wall; means for circulating fluid at an elevated temperature and pressure through each said pressure chamber; and at least one mould assembly including at least one separate mould section providing a mould cavity within which a composite or bonded metal lay-up can be located; wherein when the system is in use, the pressure chambers are held together with the elastically deformable chamber walls located in opposing relation, the at least one mould assembly containing a said lay-up being accomodated between the chamber walls while fluid at elevated temperature and pressure is circulated through each pressure chamber such that the lay-up can be compressed and cured or formed.

23 Claims, 30 Drawing Sheets

U.S. PATENT DOCUMENTS

| | | |
|---|---|---|
| 5,374,388 A | 12/1994 | Frailey |
| 5,785,760 A | 7/1998 | Sconyers et al. ............ 148/600 |
| 5,975,183 A | 11/1999 | Reis et al. |

FOREIGN PATENT DOCUMENTS

| | | |
|---|---|---|
| EP | 0 255 596 | 11/1990 |
| EP | 0 858 977 | 8/1998 |
| EP | 1000731 | 11/1998 |
| EP | 1 008 436 | 6/2000 |
| FR | 2080567 | 11/1971 |
| FR | 2705914 | 12/1994 |
| WO | WO98/53982 | 5/1998 |

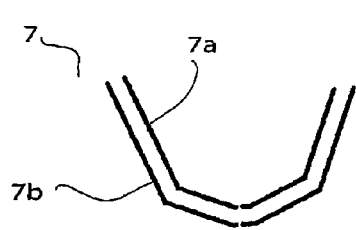
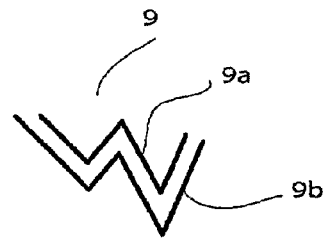
FIG.3a  FIG.3b
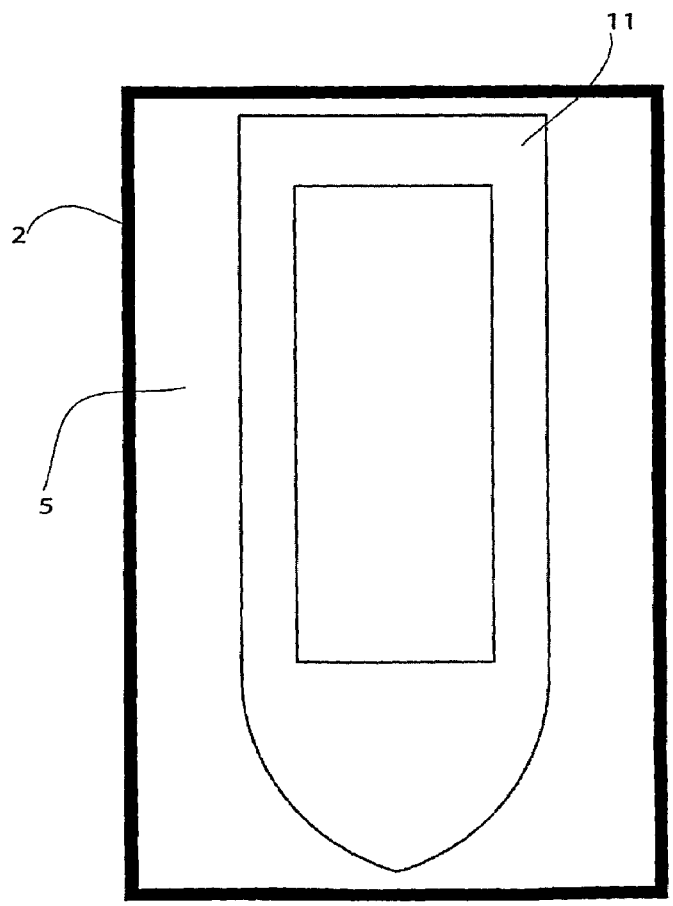
FIG.4

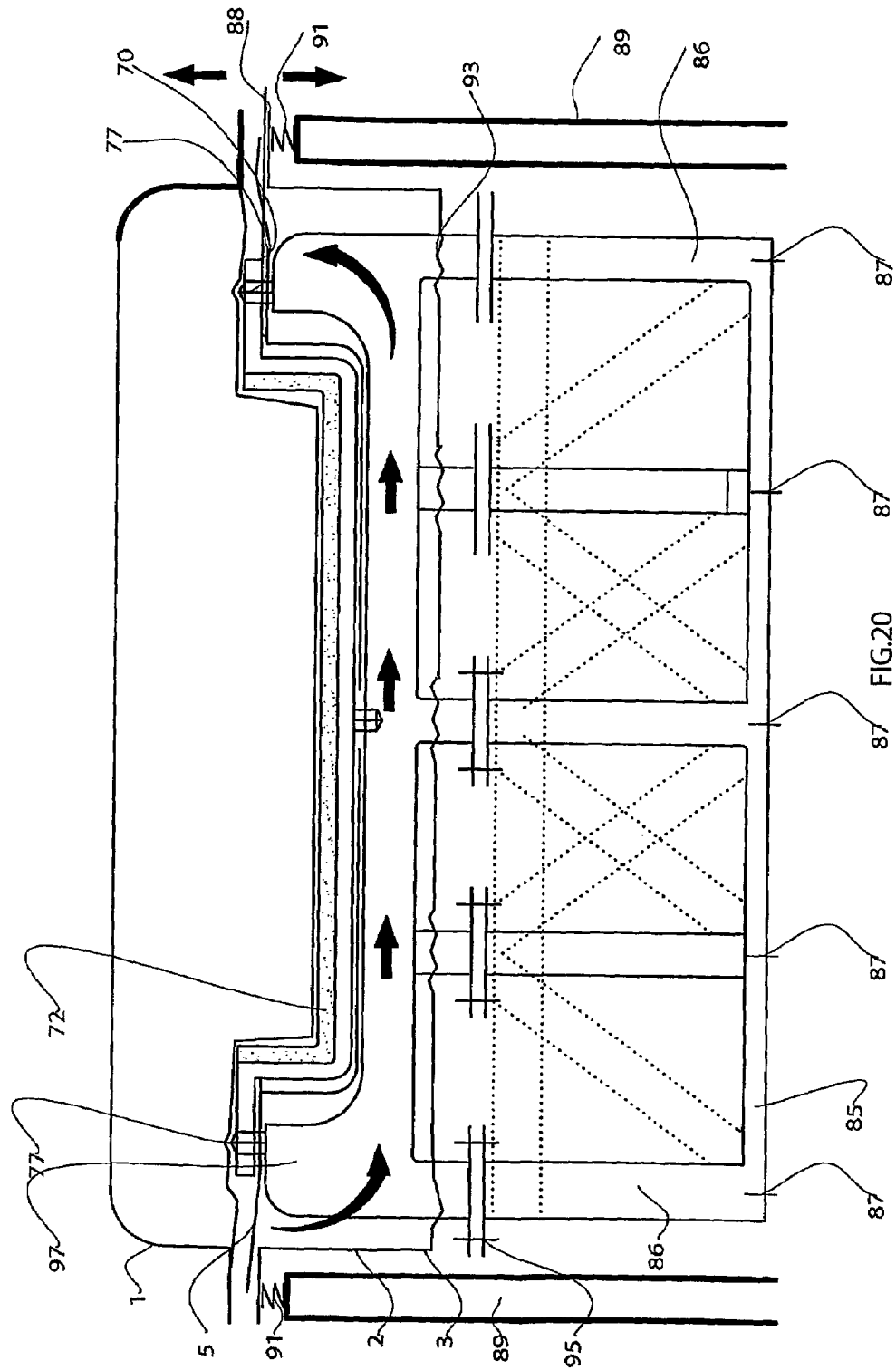

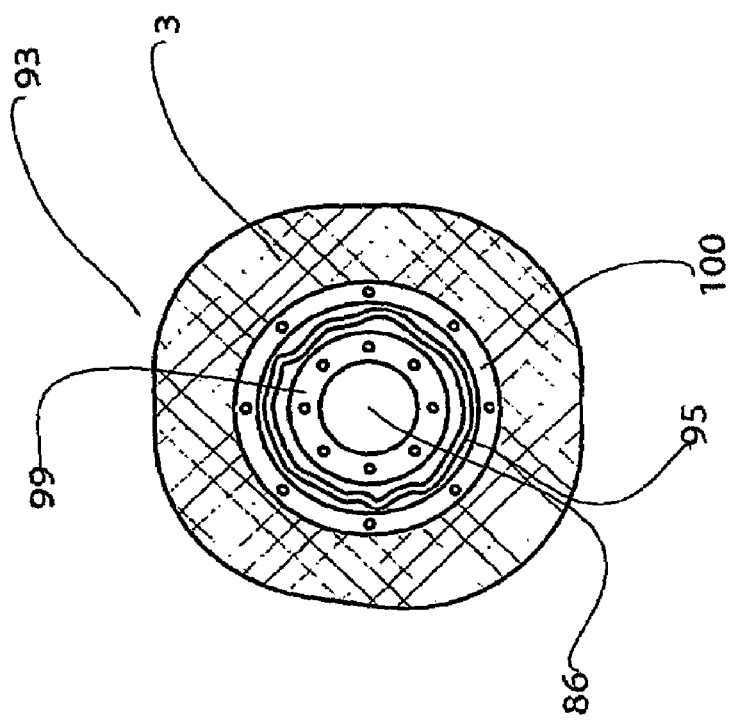
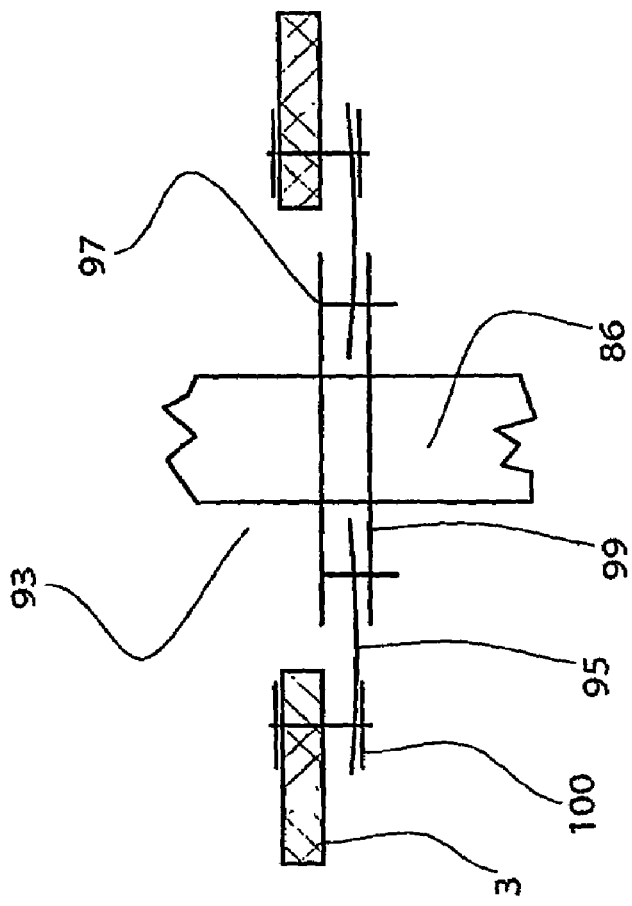
FIG.21b
FIG.21a

COMPOSITE AND METAL COMPONENT PRODUCTION, FORMING AND BONDING SYSTEM

BACKGROUND OF THE INVENTION

The present invention is directed to the manufacture of composite as well as super plastic forming and bonding of thin sheet metal components.

Composite components are typically produced by impregnating a fibrous material such as fiberglass with a resin matrix or bonding medium such as thermoplastic or thermocuring resin, or forming and bonding sheets of thermoplastic material together or in layers to form parts. This resin impregnated material is subsequently subjected to an elevated pressure and temperature to compress the material and form or cure the resin matrix or bonding medium to thereby produce the composite/bonded component. Bonded metal components are formed by shaping the thin metal sheets and placing adhesive or bonding material between the sheets then elevating the temperature whilst maintaining a holding pressure or clamping force to ensure an adequate bond. In each case the material needs to be compressed to expel excess air and resin from within the composite lay-up or metal bond to cure the laminate into a solid layer or bond the solid laminates together to form a final part. Lightweight components of high strength can be produced by this method making such components particularly suitable for aircraft, automotive and marine applications.

The Applicant has developed a system for producing such composite components as described in International Patent Application No. PCT/AU95/00593, details of which are incorporated herein by reference. The described system uses a pair of pressure chambers respectively providing a mould surface and a backing surface. The mould surface may be provided by a floating rigid or semi rigid mould forming a wall of one of the pressure chambers. The backing surface may be provided by either a second cooperating floating rigid or semi rigid mould, or a vacuum bag, or a resiliently deformable bladder forming a wall of the other pressure chamber. A composite lay-up may be made up of a layer of resin impregnated material overlaid by a peel cloth and a bleeder cloth which can be located between the mould and backing surfaces. Once the composite lay-up are placed in position, fluid at elevated pressure and temperature is circulated through each pressure chamber to thereby both compress the lay-up and form or cure the resin matrix or bonding medium. Alternatively, layers of material may be initially laid in the mould to provide a laminate, and Resin Transfer Moulding or Resin Film Infusion used to introduce the resin to the laminate thereby allowing forming of the part. The circulation of the fluid provides for very uniform curing of the component with fast cycle times, heat up and cool down and efficient energy use. Furthermore, in a preferred arrangement of this system, equal pressures can be applied to opposing sides of the composite lay-up because fluid at the same pressure is circulated through each pressure chamber. The resultant composite component has excellent material uniformity when compared with composite components manufactured with other known composite production processes.

The Applicant has also developed a system for producing, repairing, forming, and bonding both composite and metal components in International Patent Application No. PCT/AU01/00224 using at least one pressure chamber having a displaceable abutment face, with fluid being circulated at an elevated temperature and pressure.

In all of the systems, developed by the Applicant, the common principle of operation is the use of circulating fluid at elevated temperature and pressure to effect the curing process. The advantage of using circulating fluid as a heating (or cooling medium) is the ability to transfer heat rapidly and evenly to the area being heating. In practice, this results in curing times for the production composite products that are substantially shorter than that possible with conventional autoclave production processes. This is because of the higher heat transfer rates in fluid compared with air (ie typically 22 times greater with water). The result is substantially greater production speeds and lower overall production costs per unit.

Another advantage in using circulating fluid is that the heat is transferred more evenly to the lay-up with no "hot spots" as can occur using autoclave or other heating methods.

The Applicant's systems also provide relatively uniform pressure over the lay-up because of their use of circulating fluid at elevated pressure. Furthermore, in the arrangements where pressure is applied to opposing sides of a lay-up, the pressure can be balanced such that it is unnecessary to use apparatus having high structural strength to support any applied heavy loads.

Furthermore, the present invention can utilize a "balanced density" effect which enables large panels and components to be produced. Details of this effect will be hereinafter further described.

While the composite component production system described in International Patent Application No. PCT/AU95/00593 is in use, it is not possible to prepare the next composite lay-up until the composite component currently being manufactured has been cured or formed. Furthermore, it is not possible to readily change moulds to produce a different composite component as this requires the floating rigid or semi rigid mould to be detached from the pressure chamber and to be replaced with another rigid or semi rigid mould of a different configuration.

With the mould fixed in the wall of the pressure chamber it is difficult to maneuver the mould to get access to the mould for example to place the composite materials into the mould.

In addition it is difficult to work on the mould to place the stiffeners into the part whilst it is in the pressure cell with the pressure chambers surrounding it. It is possible to take the composite part out of the mould then place it in a jig and fit the stiffeners e.g. ribs, bulkheads, strongbacks etc. However this is not preferable as the composite component is not generally rigid and tends to flex until all stiffeners are in position. It is therefore preferable to place all stiffeners and complete all secondary processes before removing the part from the mould. In this way maximum dimensional accuracy is ensured.

Also in some circumstances it is necessary or preferable to have split moulds to release a part from the mould. This is difficult to accommodate within the present process without split pressure chambers and sophisticated locking mechanisms in the walls of the mould to hold the moulds together to ensure no loss of fluids.

Also, it is difficult to adapt the pressure chamber to produce composite components of widely different sizes because of the floating mould arrangement. This is therefore a "batch" process where it is not possible to undertake any further action until the current curing, forming procedure is completed. It would however be advantageous to be able to have a composite production system that allows for a "semi-continuous" process where at least a part of the manufacturing procedure can be done even when the system is currently compacting, curing and or forming a composite or bonded metal component while at the same time maintaining the quality of the component produced by such a system. It would also be advantageous to be able to produce a variety of different components and moulds for those components themselves radically decreasing the cost of tooling without having to alter the basic configuration of the sealed pressure chambers and the release of fluid from the system. This will facilitate the introduction of such a system to mass production applications because of the improved time and production efficiency.

SUMMARY OF THE INVENTION

It is therefore an object of the present invention to provide an improved system and method for producing composite or bonded metal components.

With this in mind, according to one aspect of the present invention, there is provided a system for producing composite or bonded metal components including:

first and second pressure chambers, each pressure chamber having an elastically deformable chamber wall;

means for circulating fluid at an elevated temperature and pressure through each said pressure chamber; and at least one mould assembly including at least one separate mould section providing a mould cavity within which a composite or bonded metal lay-up can be located;

wherein when the system is in use, the pressure chambers are held together with the elastically deformable chamber walls located in opposing relation, the at least one mould assembly containing a said lay-up being accommodated between the chamber walls while fluid at elevated temperature and pressure is circulated through each pressure chamber such that the lay-up can be compressed and cured or formed.

The fluid circulated through each pressure chamber may be maintained at substantially the same pressure such that the forces acting around the mould assembly and lay-up are balanced. This facilitates the use of chamber walls of an elastically deformable material such as that do not need to be of substantial mechanical strength to maintain dimensional accuracy and can therefore be of lighter construction. The chamber walls can therefore be relatively thin to allow heat to be readily transferred through to the mould assembly and lay-up.

The elastically deformable chamber walls also conform closely about the shape of the mould assembly and supported lay-up ensuring relatively uniform heat transfer throughout the mould assembly.

In certain components having a particularly convoluted outer shape, the chamber wall overlying the lay-up may not be able to properly conform against the outer shape. This could for example occur where the component to be produced has deep cavities or channels therein.

Under these circumstances, the chamber wall overlying the lay-up may be configured to at least generally conform with the shape of the component being produced. The circulation of fluid through the pressure chamber supporting the configured chamber wall would urge that configured wall chamber wall closely to the shape of the component.

Because the mould assembly is separate from the pressure chambers, it facilitates the use of the system according to the present invention is a semi-continuous process because the mould assembly and lay-up can be assembled separately from the pressure chambers. Furthermore, further mould assemblies may be set up while the pressure chambers are being used According to another aspect of the present invention, there is provided a method of producing composite or bonded metal components including:

locating a composite or bonded metal lay-up in a mould cavity of a mould assembly;

locating the mould assembly together with the lay-up between first and second pressure chambers, each pressure chamber having an elastically deformable locating the mould assembly together with the lay-up between first and second pressure chambers, each pressure chamber having an elastically deformable chamber wall, the chamber walls being located in opposing relation with the mould assembly located therebetween; and circulating a fluid at an elevated pressure and temperature though each pressure chamber such that the composite or bonded metal lay-up is compressed and cured or formed.

The mould assembly may include a single mould section for supporting the composite or bonded metal lay-up, with one of the elastically deformable walls being in direct contact with the composite or bonded metal lay-up or a bleeder cloth located over the lay-up when located between the two pressure chambers. The mould section may be of a rigid or semi rigid construction. It is also envisaged that the mould assembly include a pair of cooperating rigid or semi rigid mould sections such that the composite or bonded metal lay-up can be located therebetween.

The mould section(s) may be split to facilitate release of the completed component therefrom. This is feasible in the system according to the present invention because the mould section(s) being separate from the pressure chambers can be easily split when separate from and outside the pressure chambers. In this way the pressure chambers remain untouched and completely sealed at all times. Therefore the ability to remove the mould section(s) containing the part from the pressure chambers is preferable to having the mould section(s) sealed and attached to the pressure chamber.

Where a single mould section is used, a vacuum bag may be used to provide an initial compression of the lay-up. To this end, the vacuum bag may be located over the lay-up, and the lay-up compressed prior to the mould assembly being compressed between the pressure chambers.

The pressure chamber may include a housing supporting a said elastically deformable chamber wall on a side thereof. The said wall may have pockets, rings or attachment points for the moulds either in the elastic wall or to the walls of the respective pressure chambers or pockets cut in a rigid wall and lined with elastic material to suit the mould. The chamber wall may be formed of an elastically deformable material such as rubber.

Alternatively, the pressure chamber may include an outer support housing or frame supporting a flexible bladder therein. One face of the bladder may provide the elastically deformable chamber wall for the pressure chamber. This arrangement facilitates the maintenance of the pressure chambers. For example, if any leak is found in the pressure bladder, that bladder can be simply removed and replaced with another bladder. There is also no need to provide any specially sealing arrangement between the housing and a separate elastically deformable wall which would be susceptible to leaks.

As the heat is transferred through the chamber walls, they need to conform very closely to the shape of the mould assembly to ensure that there is relatively uniform heat transfer around the outer surface of the mould assembly and the lay-up located therein. This can however be difficult to achieve where the shape of the mould assembly is particularly convoluted. For example, mould assemblies having deep channels extending therealong can make it difficult for the chamber walls to conform around the mould assembly and the lay-up located therein.

Therefore, according to another aspect of the present invention, there is provided a mould assembly for a system for producing composite bonding metal components including:

a mould section having opposing faces;

one of said mould section faces providing a mould cavity;

the mould assembly further including a fluid flow chamber provided adjacent the opposing mould section face such that fluid circulated through the fluid flow chamber is in direct contact with at least a substantial portion of the opposing mould section face.

The fluid flow chamber may include a bladder formed of elastically deformable material such as silicon rubber secured to the mould section along its periphery thereby covering at least a substantial portion of the adjacent mould section face. At least one support membrane may interconnect the bladder and the mould section face to provide further support to the bladder as well as to guide the fluid flow through the fluid flow chamber. It is also envisaged that at least one rigid or semi-rigid heat transfer fin may extend from the mould section face. The fin(s) may facilitate the heat transfer to the mould section and help guide the fluid flow. Furthermore, the fin(s) may be attached to the bladder to provide further support for the bladder.

It is alternatively envisaged that, the fluid flow chamber may be provided by a rigid or semi-rigid housing or plate resiliently secured along its periphery to the mould section face through which fluid may be circulated.

The provision of the fluid flow chamber provides direct contact of. fluid to a substantial portion of the mould section face maximizing heat transfer from the fluid to the mould face. The above described mould assembly can be used in the production system according to the present invention.

Therefore, according to a further aspect of the present invention, there is provided a system for producing composite or bonded metal components including:

first and second pressure chambers, each pressure chamber having an elastically deformable chamber wall;

at least one mould assembly including a mould section having opposing faces;

one of said mould section face providing a mould cavity within which a composite or bonded metal lay-up can be located; the at least one mould assembly including a fluid flow chamber provided adjacent a said mould section face such that fluid circulated through the fluid flow chamber is in direct contact with at least a substantial portion of the opposing mould section face; and means for circulating fluid at an elevated temperature and pressure through each said pressure chamber and through the fluid flow chamber;

wherein when the system is in use, the pressure chambers are held together with the elastically deformable chamber walls located in opposing relation, the at least one mould assembly containing a said lay-up being accommodated between the chamber walls while fluid at elevated temperature and pressure is circulated through each pressure chamber and the fluid flow chamber of the at least one mould assembly such that the lay-up can be compressed and cured or formed.

According to yet another aspect of the present invention, there is provided a method of producing composite or bonded metal components including:

locating a composite or bonded metal lay-up in a mould cavity of a mould assembly including a mould section, the mould section including a face opposing the mould cavity, with a fluid flow chamber being located adjacent said opposing mould section face;

locating the mould section together with the lay-up between the first and second pressure chambers, each pressure chamber having an elastically deformable chamber wall, the chamber walls being located in opposing relations with the mould sections with said lay-up located therebetween; and circulating fluid at an elevated temperature and pressure through each pressure chamber and the fluid flow chamber such that the composite or bonded metal lay-up is compressed and cured or formed.

The use of the mould assembly with the fluid flow chamber having fluid circulating therethrough allows a separation of the components providing the pressure application (the pressure chambers) and the component providing the heat application (the mould assembly). The facilitates improved management of both the pressure and heat application to the mould assembly.

As fluid is separately circulated through the pressure chambers and the fluid flow chamber, the temperature of the circulating fluid in the pressure chambers can be maintained relatively constant (for example, about 80° C.) while the temperature of the fluid circulating through the fluid flow chamber can be cycled between higher and lower temperatures (for example between 40-200° C.). This is because it is not necessary in this arrangement to heat or cool the pressure chamber walls. It is therefore that fluid passing through the fluid flow chamber that provides the principal heat or cooling source for the mould assembly. Another advantage in utilizing the arrangement is that the relatively lower volume of fluid to be required to be circulated through the fluid flow chamber compared with the pressure chambers means that less fluid is required to effect changes in temperature resulting in faster cycling times.

A separate top fluid flow chamber may also be located over the lay-up. The top fluid flow chamber may be in the form of a bladder formed of elastically deformable material. A face of the bladder may be generally configured to at least generally follow the shape of the mould cavity when fluid is circulated therethrough. The top fluid flow bladder may be located over the lay-up and fluid circulated at elevated temperature through the top fluid flow bladder while the mould assembly is located between the pressure chambers to thereby supply heat to the lay-up. This provides for more uniform heat transfer, the top fluid flow chamber conforming closely to the lay-up. Therefore, the top fluid flow bladder in conjunction with the mould assembly having the attached fluid flow chamber acts to supply heat to both the lay-up and the mould section.

The fluid temperature circulating through the top fluid flow chamber may also cycle between higher and lower temperatures as within the fluid flow chamber of the mould assembly.

The mould assembly including the fluid flow chamber, with the top fluid flow chamber located over the lay-up supported within the mould assembly may also be located between the pressure chambers of the production system of the present invention.

It is sometimes necessary to bond other component parts to the composite or bonded metal component. These component parts can include stringers, reinforcement ribs or attachment rings. It would be preferable to be able to bond these component parts at the time the component is being produced. This would provide far superior bonding of the parts to the component.

Therefore, according to yet another aspect of the present invention, there is provided a system for producing composite or bonded metal components, the system including first and second pressure chambers, each pressure chamber having an elastically deformable chamber wall; means for circulating fluid at elevated temperature and pressure through each said pressure chamber, a mould assembly including a mould cavity within which a composite or bonded metal lay-up and at least one component part can be located, and a configuring arrangement for positioning the component parts on said lay-up, wherein when the system is in use, the pressure chambers are held together with the elastically deformable chamber walls located in opposing relation, the mould cavity containing a said lay-up and at least one component part located in position by the configuring arrangement being accommodated between the chamber walls while fluid at elevated temperature and pressure is circulated through each pressure chamber such that the lay-up is compressed and cured or bonded and the at least one component part is bonded thereto.

The component parts may include stringers, reinforcement ribs or any other component that needs to be bonded to the composite or bonded metal component.

A vacuum bag may be laid over the lay-up to allow for an initial compression of said lay-up The configuring arrangement may include at least one strap configured to engage and locate the or each component parts in its desired position over the lay-up. For example, when the component parts are reinforcement ribs, the straps may extend laterally relative to the rib, the straps including one or more "U" shaped bends to engage the upstanding portion of the rib thereby locating the rib in position over the lay-up. The straps may be located on or under the vacuum bag.

Alternatively, the configuring arrangement may be provided by the chamber wall of the pressure chamber located over the mould cavity, the chamber wall being configured to include pockets or channels for accommodating and locating component parts over the lay-up. The pressure chamber may include an outer housing or frame for accommodating a bladder bag, a face of the bladder bag providing the configured chamber wall. The bladder bag may be initially located in position over the lay-up and component parts before the outer housing is located over the bladder bag. The bladder bag can then be fully inflated by the circulating fluid. This arrangement makes it easier to locate the bladder bag and the cooperating component parts in position over the lay-up prior to inflation of the bladder bag. It is also envisaged that more than one bladder bag could be accommodated in the outer housing. This may allow this system to be used on very large components where it would not be possible to use a single bladder only.

In another preferred embodiment, a further fluid flow bladder may be provided, the fluid flow bladder being formed from elastically deformable material and may be adapted to conform or be readily conformable over the component parts and the lay-up when laid over them. The bladder may have a relatively narrow overall bladder thickness to thereby facilitate the conforming of the bladder thereon. Fluid at elevated temperature and pressure may be circulated through the fluid flow bladder.

The configuring arrangement further includes providing a configured chamber wall of the pressure chamber adapted to conform with and urge the liquid flow bladder more closely against the component parts and the lay-up upon which the component parts are located.

In another embodiment, the configuring arrangement may be in the form of an internal support frame located within the pressure chamber locatable over the mould cavity. The internal support frame may be adapted to support an elastically deformable chamber wall of that pressure chamber having a configuration adapted to conform against the lay-up and component parts prior to the circulation of fluid through the pressure chamber. The configured chamber wall moves away from the support frame to engage the mould assembly when fluid is circulated therethrough and draws back onto the support frame when there is no fluid flow therethrough.

Location means may also be provided to accurately locate a mould section on the chamber wall and maintain accurate alignment and dimensional stability of the mould in operation. The location means may simply be in the form of attachment points on the chamber wall for the mould assembly. For example, lugs, sockets, rings or pockets may be provided on the chamber wall to which the mould assembly could be secured. The attachment point can be tethered to the pressure chamber housing using wire or other means. These help to generally maintain the attachment points in their correct position. The location means may alternatively include a location frame located within the pressure chamber, and having at least one locating pin extending through the chamber wall of that pressure chamber. A plurality of locating pins may preferably extend from the chamber wall, each locating pin extending from the location frame. This location frame may be separate from the housing of the pressure chamber and may therefore move independently from and may not be directly connected to the housing. The location frame may also be tethered to the pressure chamber housing to maintain it in the correct position therein. The location pins therefore may pass through the chamber wall and may be adapted to engage cooperating apertures provided in a said mould section. The locating pins therefore locate the mould section in a specific place on the chamber wall.

This location arrangement also allows the pressure chamber walls to be positioned at an inclined angle relative to a horizontal plane as the mould section can be maintained in position over the chamber wall though this is not imperative to the ability to incline the mould. The advantage of this inclined position is that it allows and encourages any air or gas remaining in the composite or bonded metal lay-up to move up to the uppermost section of the lay-up as the rest of the lay-up is saturated with resin. This air is eventually pushed/driven out from the lay-up by the transferred resin. This results in a composite component with fewer air bubbles/voids.

The use of a location frame within the pressure chamber is acceptable as long as the location frame can be readily accommodated with the pressure chamber. It is preferable that the volume of the pressure chamber, through which the circulating fluid flows not be increased to support a larger location frame. This is because a larger amount of fluid will need to be circulated through the pressure chamber which can be undesirable.

Therefore, according to a further aspect of the present invention, there is provided a system for producing a composite or bonded metal components including:
first and second pressure chambers, each chamber having an elastically deformable chamber wall;
means for circulating fluid at an elevated temperature and pressure through each said pressure chamber; and
at least one mould assembly including a mould section providing a mould cavity within which a composite or bonded metal lay-up can be located,
location means for locating the at least one mould assembly in a fixed position, the pressure chamber being supported about the at least one mould assembly in a floating relation relative thereto;
wherein when the system is in use, the pressure chambers are held together with the elastically deformable walls located in opposing relation, the at least one mould assembly containing said lay-up being accommodated between the chamber walls while fluid at elevated temperature and pressure is circulated through each pressure chamber such that the lay-up can be compressed and cured or formed.

The mould assembly may be fixed in position by a location frame rigidly supported outside of the pressure chambers. The volume of the pressure chamber does not therefore need to be included to accommodate a location frame therein. The mould assembly may be supported by at least one support post of the location frame extending through at least one of the pressure chambers.

This system operates in an opposite manner to the earlier described arrangement in that the mould assembly is held fixed whereas the pressure chambers can float about the mould assembly. By comparison in the earlier arrangement, the pressure chambers are fixed in position, with the mould assembly floating between the pressure chamber walls. The manufacturing process is however still the same in both system arrangements.

In the abovedescribed arrangement, the mould assembly is rigidly supported with the mould system being supported on the location frame. It is however also envisaged that only one pressure chamber be used, the pressure chamber being locatable over the rigidly supported mould assembly.

Therefore, according to another aspect of the present invention, there is provided a system for producing a composite or bonded metal components including:
a fixed mould assembly including a mould section providing a mould cavity;
a pressure chamber having an elastically deformable chamber wall; and
means for circulating fluid at an elevated temperature through the pressure chamber;
wherein when the system is in use, the pressure chamber is located over the at least one mould assembly with the chamber wall located over the at least one mould assembly, the mould cavity accommodating a said lay-up, and fluid at elevated temperature and pressure is circulated through the pressure chamber such that the lay-up can be compressed and cured or formed.

The pressure chamber may be located in floating relation over the mould assembly. The pressure chamber may therefore move relative to the fixed mould assembly when fluid is circulated therethrough.

The system does not provide for the balancing of forces applied to the mould section. Nevertheless, the benefits achieved through the use of circulating fluid in the pressure chambers are still present making this system particularly useful for components not requiring dimensional accuracy.

The fluid circulating means including at a plurality of fluid reservoirs each supporting fluid at differing relative temperatures, and flow control means for directing fluid of different temperatures to the pressure chamber. This arrangement has been previously described in the Applicants International Patent Application No. PCT/AU95/00593, details of which are incorporated herein by reference.

Means may be provided to provide a cyclically variable pressure in the fluid within the pressure chamber. For example a vibration generator may be secured to the pressure chamber to vibrate the pressure chamber and the fluid therein. The use of this vibration facilitates the removal of air bubbles within the composite or bond metal material. The use of vibration is generally applicable to all of the production systems according to the present invention.

It should be noted that the pressure chambers can even operate when in a vertical position, with the chamber walls being located in a generally vertical plane. This demonstrates a key aspect of the system and method of the present invention being the "balanced density effect. This is where the pressure of the circulating fluid and the fluid pressure of the resin when in a liquefied state are generally balanced within the system because the density of the fluid and the resin are similar. The density and viscosity of the liquefied resin is close to that of water and the heat transfer fluid used. Therefore, the pressure applied by the circulating fluid to the liquefied resin is generally balanced even in situations where the pressure chambers are vertical or inclined. Although there would be a natural tendency for the liquefied resin to slump down towards the lower part of the mould section, the fluid pressure of the circulating fluid also increases with increasing depth in the pressure chamber. This results in a balancing of the fluid pressures between the liquefied resin and the circulating fluid along the mould section thereby counteracting the tendency for the slumping of resin towards the lower part of that mould section. The result is that it is possible to maintain a consistent thickness in the composite component produced in an inclined or vertical pressure chamber according to the present invention. This process overcomes many of the difficulties experienced with the prior art in that it enables large parts with deep sides to be constructed and not have the resin, due to the effect of gravity, run down the side of these deep faces resulting in a "wicking" or slumping effect wherein the resin flows down the wall, even with high levels of vacuum applied by vacuum bag, resulting in excess resin at the base of the wall and a shortage of resin at the top. To overcome this effect matched metal moulds are generally employed to provide an enclosed rigid resin volume but at consequent high cost. The present invention can therefore produce far larger panels or other components than conventional composite production systems.

In another aspect of the invention the pressure chambers can be progressively filled with fluid from the empty state to the full state. As the column of hot fluid fills the pressure chambers it presses against the bladder and mould walls compressing the laminate therebetween and melting the resin. It is envisaged that this will result in a line or wave of resin moving in front of the raising column of fluid. This will tend to force the air out of the laminate and result in a controlled wet out of the part as the fluid column and thus resin column rises over the face of the part. This is not possible or practical using conventional systems of either rigid or flexible air filled bladders. The system of balanced density provides very accurate resin and fibre control of the laminate by forming around the part accurately to make up for variations in thickness and provide even pressure and resin content over all the part from top to bottom.

The means for circulating the fluid may be the same as or similar to the arrangement shown in International Patent Application No. PCT/AU95/00593. The fluid may preferably be oil.

The arrangement includes a series of fluid reservoirs each containing fluid at differing temperatures. For example, three fluid reservoirs may be provided containing fluid at a low and high temperature respectively, the third fluid reservoir containing fluid at a temperature intermediate the fluid temperature of the other fluid reservoirs.

Each pressure chamber and fluid flow chamber may be in fluid communication to all the fluid reservoirs such that fluid at differing temperatures can be circulated therethrough. A series of fluid pumps and valves may be provided for controlling the fluid flow from each reservoir. Each fluid reservoir may be pressurized so that the fluid being delivered from the reservoir is at an elevated pressure.

The advantage of this arrangement is that it is not necessary to heat and cool the fluid within the system at each production cycle of a component reducing energy usage of the system.

Each fluid reservoir may be provided with a "ring main" so that a number of production systems can be connected at any one time to the reservoirs.

The cycling of fluid at differing temperatures may be staggered between each production system so that there is not an excess drain of fluid from any fluid reservoir at any one time. This also enables the curing process to start at any time and moulds once prepared do not have to wait for a curing cycle to finish before a new cycle can commence which is ineeient in a fixed station design.

Furthermore, means may be provided to allow the pressure in the chambers to be cyclically varied to produce vibration or pressure waves through the fluid through water hammer or piston or vibrating the mould directly during at least part of the duration of application of pressure in the pressure chambers as described in the abovenoted International Patent Application.

At least one mould assembly may be located between the pressure chambers when the system is in use. It is also possible to have a number of mould assemblies between the pressure chambers when in use to enable a plurality of composite components to be produced at the same time.

The mould section(s) can be loaded with the composite lay-up or bonded metal sheets prior to being located between the pressure chambers. This therefore enables the ongoing preparation of further composite lay-ups within mould sections while another composite lay-up is being compressed and cured or formed. Furthermore, the use of separate mould sections allows different composite components to be produced without changing the configuration of the pressure chambers. This also allows the production of a plurality of composite components at the same time if a plurality of mould assemblies can be located between the pressure chambers.

A vacuum film may also be placed over the composite lay-up, with the edges of the film being sealed against the mould section. Air may then be extracted from under the vacuum film to thereby remove as much of the air and other gases as possible from the composite lay-up. This helps to minimize the amount of air bubbles/voids within the final composite component. It should however be noted that the use of the vacuum film is not essential to the operation of the present invention.

Once the mould assembly is located between the pressure chambers, the introduction of pressurised fluid into the chambers urges the elastically deformable chamber walls to deform about the mould assembly such that a pressure is applied to the composite lay-up located in the mould section(s), the shape of the final composite component being defined by the shape of the mould section(s). The outer surfaces of these mould section(s) are preferably smooth to ensure that their surfaces are slippery to the elastically deformable faces of the pressure chambers. With this slip the elastic deformable pressure chamber walls can slide into close contact with the shape of the mould section(s) and impart the maximum force and heat to the mould section(s) with the least distortion. To enhance this process a lubricant can be applied to the mould section(s) or the pressure chamber wall. In addition or as part of the lubrication to obtain maximum heat transfer from the fluid within the pressure chambers to the mould section(s) and the component within the mould it is preferable to have a fluid or transfer medium to transfer the heat. Once the elastically deformable walls have come into close contact with the mould section(s), the pressure from within the pressure chamber compresses the composite lay-up or bonded metal component thereby removing excess resin or bonding medium and air bubbles therefrom. As previously described above, the mould assembly could alternatively include a mould section having a fluid flow chamber. Furthermore, a top fluid flow chamber could also be located over the mould assembly. This mould assembly and optionally the top fluid flow chamber can then be located between the pressure chamber walls to compress and cure the lay-up located in the mould assembly. The application of a cyclically variable pressure or vibration producing pressure waves through the fluid or vibration of the mould assembly itself facilitates the removal of air bubbles ensuring that the final composite/bonded metal component has very uniform material properties therethrough. Furthermore, because the fluid is circulated through the pressure chamber, this ensures that there is relatively rapid and uniform heating and cooling of the composite lay-up or bonded metal component along its entire surface ensuring uniform curing and cooling of the lay-up/part/metal component. In addition, at any point in the cycle, the fluid flows can be stopped and internal heaters used to maintain the temperature to fully cure the part.

The composite lay-up may include layers of resin impregnated material (known as "prepreg") or layers of metal sheet. Reinforcements for the final composite component and other dry fibers may also be included in the lay-up. A peel cloth and bleeder cloth may then be placed over the composite lay-up where required. The resin matrix or bonding medium in the form of resin is provided within the prepreg thermoplastic sheet or metal sheet. It is however also envisaged that at least a significant amount of the resin matrix or bonding medium be supplied to the composite lay-up once it has been applied to the mould section(s). The composite lay-up may be a relatively dry "preform" formed from layers of or plies of continuous fibres. The resin matrix or bonding medium may be supplied to the mould section(s) after the dry preform has been located between the chamber walls by means of one or more supply lines or sprues. This enables the system according to the present invention to utilize what is known as a resin transfer moulding (RTM) process for producing the composite component.

According to yet another aspect of the present invention, there is provided a method of producing composite or bonded metal components including: locating a composite or bonded metal lay-up in the mould cavity of a mould assembly; locating the mould assembly together with the composite or bonded metal lay-up between first and second pressure chambers at least substantially filled with fluid, each pressure chamber having an elastically deformable chamber wall, the chamber walls being located in opposing relation with the mould assembly located therebetween; supplying resin to the mould assembly and through the lay-up located therein; collecting the overflow of resin from the mould assembly for subsequent supply to another mould assembly; and circulating fluid at an elevated pressure and temperature through each pressure chamber such that the lay-up and is compressed and cured or formed.

The steps of collecting and supplying the overflow of resin from one mould assembly to another mould assembly may follow sequentially over one or more further mould assemblies.

This can lead to a significant reduction in the amount of resin wasted when resin is supplied separately to a number of mould assemblies using RTM.

Resin may be supplied under pressure from a first resin container to a first mould assembly, the amount of resin being supplied being greater than that required for the lay-up in the first mould assembly. The result is a wave or resin traveling through the mould assembly. This resin wave may include a moving front of resin containing excess resin and may be in the form of a thick wavefront of resin passing therethrough. The mould assembly may be held in an inclined position such the pressure of the fluid, which increases with depth in the fluid, helps to force the resin up through the lay-up. The overflow of resin from the first mould assembly can then be supplied to subsequent mould assemblies. Air would be pushed out of the lay-up by the traveling resin wavefront reducing or eliminating air bubbles in the final component. This excess resin may be initially delivered to a subsequent resin reservoir which may be under vacuum. Further resin may be squeezed from the lay-up when a valve closes off the first resin container and pressure is applied to the mould assembly, this additional resin being collected in the subsequent resin reservoir. A valve controlling the resin flow from the subsequent resin reservoir to the next mould assembly may be opened and resin can be pumped under pressure into the next mould assembly. This can continue over several mould assemblies if required.

The use of a wavefront of resin moving through one mould assembly after another therefore acts to minimize the wastage of resin that could occur if each mould assembly is supplied separately.

Another way of supplying resin to the dry preform is by way of a plurality of solid resin blocks or tiles which can be distributed over the surface of the dry preform which is itself supported in a mould section. The mould section supporting the dry preform and blocks/tiles of resin can then be located between the pressure chambers, and the resin is then melted by circulating fluid at an elevated temperature through the pressure chambers. The system according to the present invention can therefore also utilize what is known as a resin film infusion (RFI) process.

It has been found that the RTM process can produce a relatively brittle composite product. This is because the resin must be able to be readily transferred lengthwise along the plane of the composite lay-up. The resin must therefore be of a "short molecular chain" type to enable ready transfer of the resin through the lay-up. The resultant product can be relatively brittle.

By comparison, because the RFI process distributes solid resin blocks over the composite lay-up, the resin, when melted only needs to wet the area of the composite lay-up immediately adjacent to the resin block. The resin can therefore be a "toughened" type having relatively longer molecular chains. The resultant composite product produced in a RFI process can have greater structural strength than products produced using a RTM process.

Although the RFI process can produce an improved composite product, it can be labour intensive because of the need to manually distribute the resin blocks over the dry preform.

Therefore, according to a further aspect of the present invention, there is provided a method of producing composite or bonded metal components including:
applying a layer of solidified resin over a mould surface of at least one rigid or semi-rigid mould section;
locating a composite or bonded metal lay-up in said at least one rigid or semi rigid mould section;
locating the at least one mould section together with the lay-up between first and second pressure chamber, each pressure chamber having an elastically deformable chamber wall, the chamber walls being located in opposing relation with the at least one mould section located therebetween; and circulating fluid at an elevated pressure and temperature through each pressure chamber such that the resin layer is liquefied and the liquefied resin is transferred into the lay-up and is compressed and cured or formed.

The viscosity of the resin varies substantially with temperature. Therefore, heated resin in a liquefied state can be sprayed onto the mould surface. This surface may be at a lower temperature than the resin. Means may be provided to chill the mould section. This results in the solidification of the resin into a layer on the mould surface. One way of allowing the precooling of the mould section is to provide cooling passages or cavities within the mould section through which fluid can be circulated. These cooling passages may be provided immediately under the mould surface to maintain that surface at the required temperature. In another application the mould may be sited upon a separate bladder that is chilled and on the carrier holding the mould.

This method provides a product similar to that produced by the RFI process. The method according to the present invention is however less labour intensive.

The resin can be of very high viscosity that at low temperature and without vibration, sticks and readily adheres to the mould to build up a thick layer and maintain high thixostropy, that is not to slump or fall off the mould surface. The physical behaviour of the resin is wax-like in characteristics. The dry fiber reinforcing and prepreg or wet lay-up material can then be placed within the mould. The mould section can then be placed within the pressure cell. Once in position the pressure can be applied and the temperature increased, to rapidly melt the resin reducing its viscosity and wetting out the fiber reinforcement. There can be sequential heating of the mould section, with the composite lay-up being initially heated to prepare it for subsequent wet out by the resin. The resin will more easily wet a heated composite lay-up. Heat may then be subsequently applied to the mould section to liquefy the resin layer and allow the resin transfer to occur. It may be preferable to locate a transfer control means such as a Kevlar veil between the resin layer and the composite lay-up. This veil prevents the transfer or resin until the resin is at a low enough viscosity to readily wet out the composite lay-up. This minimizes the possibility of dry spots in the composite lay-up that can occur if the resin is too viscous.

The mould section can also be vibrated to spread and liquefy the resin and remove any entrapped air. In this way the resin layer is liquefied, forced out into the dry fiber reinforcements, the air driven out of the laminate, the laminate compressed and the part cured.

Separate supply lines may respectively supply a resin and a catalyst to a spray head. The resin and catalyst can be mixed while passing through the spray head. It is however also envisaged that different resins may be sprayed simultaneously or alternatively by the spray head on the mould surface, the resins reacting to form the resin layer. The resin may also be sprayed in different spray patterns over the mould surface to provide areas of different resin thickness in the final resin layer. This enables the correct amount of the resin to be supplied to areas of a composite lay-up having varying thicknesses. Also, this enables "prepacks" to be properly impregnated with precisely placed and measured amounts of resin and then cured. The spraying process combined with the ability to "freeze" or chill the resin into position as it hits the mould or shortly thereafter provides for very accurate placement of the resin into the position on the mould to accurately wet out the prepack by driving or transferring the resin into the prepack as it is melted. This has been referred to as Resin Spray Transfer or RST. These prepacks include preinstalled components such as attachment lugs and so on and therefore require different amounts of resin to be supplied to different areas of the prepack.

An important advantage of the resin characteristics is that because the resin solidifies as soon as it contacts the chilled surface, it enables the lay-up to be immediately held in position in the mould. This is advantageous where the surface is inclined or vertical.

The apparatus used to spray the resin may be heated and cooled by the fluid supplied from the same fluid circulation system used to circulate fluid through the pressure chambers. To this end, the resin supply line may include an outer conduit through which fluid is circulated and an inner conduit located at least generally concentrically within the outer conduit. The resin is supplied to the spray head through the inner conduit. Fluid at elevated temperature can be circulated through the outer conduit when the resin needs to be maintained in a liquid state. This arrangement ensures that there is uniform heating of the resin within the inner conduit as the resin flows therethrough. Fluid at elevated temperature can also be circulated about the spray head and about a resin hopper where solidified resin is initially heated and melted before being supplied to the resin line. The hopper may include outer hollow walls though which the fluid circulate. Alternatively, tubes through which the fluid can circulate may extend around the hopper wall.

The temperature of the fluid circulating through the resin spray apparatus can be adjusted to avoid the curing of the resin within the system. Cooler fluid can be circulated though the apparatus when no resin is being sprayed to stop any curing reaction of the resin.

Other means for applying a resin matrix bonding mediums to the composite lay-up are also envisaged. For example, this material can be in the form of a power or a film or wet out of a cloth or as part of a thermoplastic sheet applied over the composite lay-up.

The present invention allows for a semi-continuous production of composite components facilitating mass production of such components.

Therefore, according to a further aspect of the present invention, there is provided a method for producing composite or bonded metal components including:

preparing and locating a composite or bonded metal lay-up in the mould cavity of a plurality of mould assemblies;

locating one or more mould assemblies between two separated pressure chambers, each pressure chamber having an elastically deformable chamber wall bringing the pressure chambers together in a production stage such that the or each mould assembly is located between the chamber walls of the pressure chambers;

circulating fluid at elevated temperature and pressure through each pressure chamber during said production stage to thereby compress and cure or form the component;

removing the or each mould assembly from between the pressure chambers; separating the completed component from the or each mould assembly; and replacing the or each mould assembly with a further one or more mould assembly accommodating a said lay-up for a following production stage.

The mould assembly may include at least one mould section. Alternatively, the mould assembly may include a mould section having a fluid flow chamber as previously described.

The fluid may be circulated by a fluid circulation means including a plurality of fluid reservoirs, each containing fluid at relatively different temperatures, and fluid supply means for controlling the fluid flow to the pressure chambers and fluid flow chamber as required. Each fluid reservoir may include a ring main to facilitate supply of fluid to a plurality of pressure chambers.

The abovedescribed method allows for a semi-continuous process for the production of composite or bonded metal components because the mould assemblies can be prepared beforehand.

It is also envisaged that the production system described in International Patent Application No. PCT/AU95/00593 would be adapted to provide for semi-continuous process.

Therefore according to another aspect of the present invention, there is provided a method for producing composite or bonded metal components including:

preparing and locating a composite or bonded metal lay-up in the mould cavity of a plurality of mould sections, each mould section being resiliently mounted and forming a chamber wall of a bottom pressure chamber respectively;

locating each said bottom pressure chamber under a separate top pressure chamber including an elastically resilient chamber wall, said chamber wall being located over the mould cavity, bringing the top and bottom chambers together in a production stage such that the chamber wall of the top chamber is located over the mould section;

circulating fluid at elevated temperature and pressure through the top and bottom pressure chambers during the production stage to thereby compress and cure or form the component, and replacing the bottom pressure chamber with another bottom pressure chamber accommodating a said lay-up for the next production stage.

The bottom pressure chamber may be mounted for at least generally horizontal movement to enable each bottom pressure chamber to be located under the upper pressure chamber which may be located in one position and moveable in an at least generally vertical position.

For example, the pressure chamber may support wheels or be mounted on a trolley.

Fluid supply lines may. be secured to the upper pressure chamber. The fluid supply lines may be respectively connected to and released from each bottom pressure chamber as they are moved under the upper pressure chamber. It is however also envisaged that the bottom pressure chambers be held stationary and the upper pressure chamber moveable over each bottom pressure chamber.

In certain applications, it may be acceptable to utilize a production system utilizing a single pressure chamber as previously described.

Therefore according to a further aspect of the present invention, there is provided a method for producing composite or bonded metal components including:

preparing and locating a composite or bonded metal lay-up in the mould cavity of a plurality of rigidly mounted sections;

locating each said mould section under a top pressure chamber including an elasticity resilient chamber wall, said chamber wall being located over the mould cavity, bringing the top pressure chamber down onto the mould section in a production stage such that the chamber wall of the top chamber is located over the mould section;

circulating fluid at elevated temperature and pressure through the top pressure chamber during the production stage to thereby compress and cure or form the component, and replacing the mould section with another mould section accommodating a said lay-up for the next production stage.

The structural strength of the mould section could be increased in another preferred embodiment of the mould section. This mould section may include an inner mould skin providing the mould cavity, an outer mould skin on the opposing side of the mould section, and a series of reinforcement fins extending between the inner and outer mould skins. The inner mould skin may be thicker than the outer mould skin for dimensional accuracy. The reinforcement fins act to provide a series of box structures within the mould section. This is because the reinforcement fins also act as heating or cooling fins improving the heat transfer efficiency to the mould section. Fluid at elevated temperatures can also be circulated though these box structures. The outer mould skin can also be provided with an insulation layer.

The reinforced mould section is more rigid than typical single wall mould sections as well as having better heat transfer efficiencies

BRIEF DESCRIPTION OF THE DRAWINGS

It will be convenient to further describe the invention with respect to the accompanying drawings which illustrate preferred embodiments of the composite or bonded metal production system according to the present invention. Other embodiments of the invention are possible, and consequently, the particularity of the accompanying drawings is not to be understood as superceding the generality of the proceeding description of the invention.

In the drawings:

FIGS. 3a and 3b are side cross-sectional views of co-operating mould sections for producing a boat hull and deck moulding respectively;

FIG. 4 is a top view of a pressure chamber of the system of FIG. 1 supporting a large deck mould assembly;

FIGS. 20 to 21b are schematic views showing another embodiment of a production system according to the present invention;

DETAILED DESCRIPTION

Figure 2:
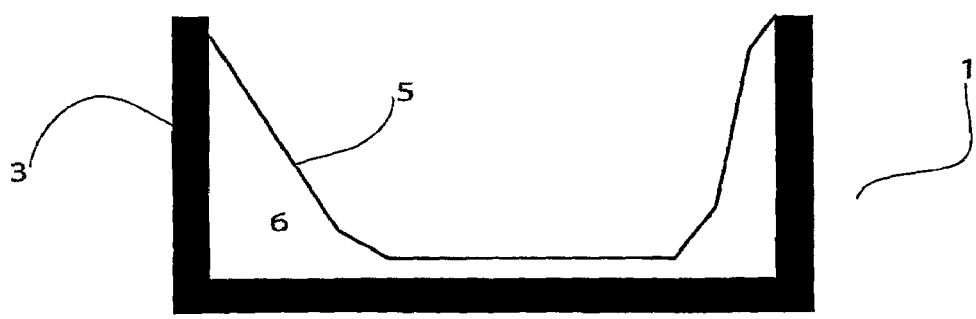
FIG. 2 is a side cross-sectional view of one of the pressure chambers of the system of FIG. 1.

The composite components production system according to the present invention includes separate upper and lower pressure chambers 1, 2, one of said chambers being shown in FIG. 2. Each pressure chamber includes a main housing 3 supporting an elastically deformable and readily conformable chamber wall 5. The top pressure chamber 1 can be located over the bottom pressure chamber 2 with their respective elastically deformable and readily conformable chamber walls being located in opposing relation. Mould section assemblies 7, 9 can be located between the opposing chamber walls 5. Each mould assembly may typically include an upper mould section and lower mould section as for example shown in FIGS. 3a and 3b. FIG. 3a shows a mould assembly 7 for producing a boat hull including an upper mould section 7a and lower mould section 7b. A composite lay-up may be located between the upper and lower mould sections 7a, 7b. This composite lay-up may typically include resin impregnated material, dry fibres, and reinforcement materials. FIG. 3b shows a mould assembly 9 including an upper mould section 9a and lower mould section 9b for producing a deck moulding for the boat. A composite lay-up may also be provided between the upper and lower mould sections 9a, 9b.

Figure 5:
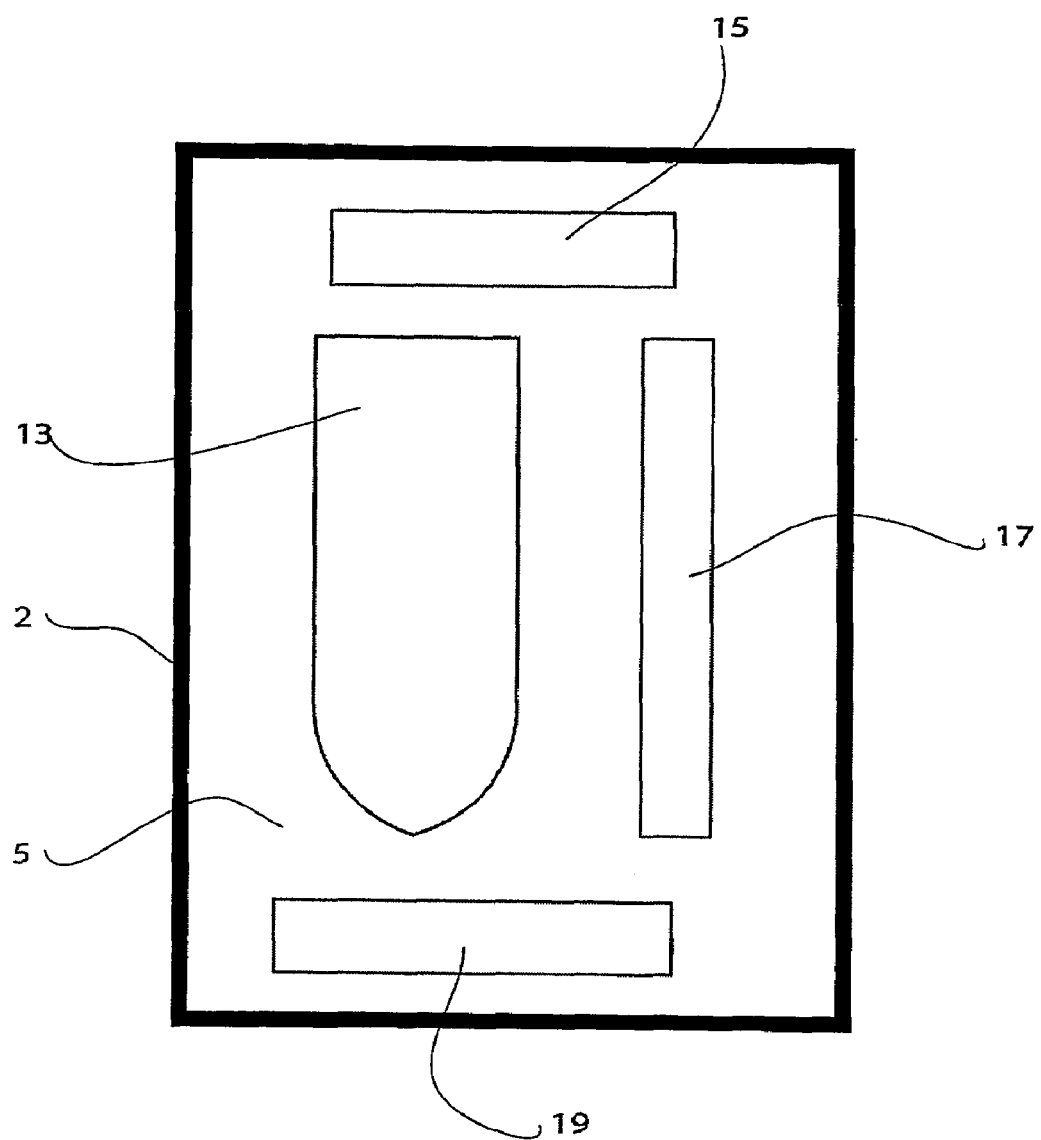
FIG. 5 is a pressure chamber of the system of FIG. 1 supporting a plurality of mould assemblies.

With the top pressure chamber 2 removed, the mould assemblies can be placed on top of the elastically deformable chamber wall 5 of the bottom pressure chamber 2. FIG. 4 shows the bottom pressure chamber 2 supporting a single. large deck mould assembly 11 which covers most of the surface area of the chamber walls 5. It is however possible to locate a number of smaller mould assemblies 13, 15, 17, 19 on top of the chamber wall 5 of the bottom chamber 2 as shown in FIG. 5.

Figure 1:
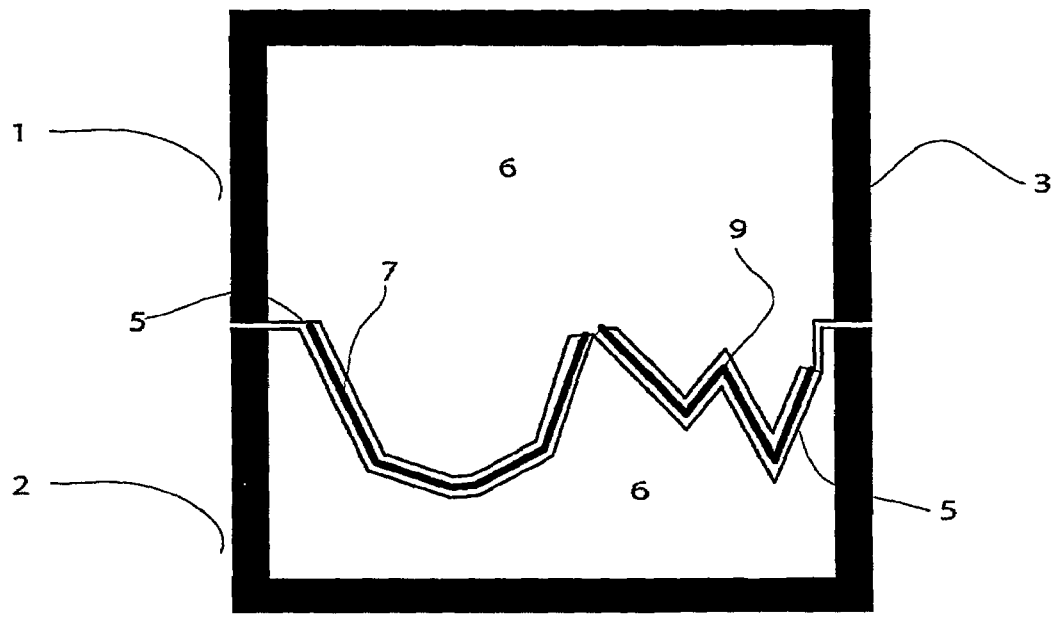
FIG. 1 is a side cross-sectional view of a system for producing composite or bonded metal components according to the present invention.

Once the mould sections have been located on the bladder or deformable wall of the bottom pressure chamber 2, the top pressure chamber 1 can then be laid over the bottom pressure chamber 2 as shown in FIG. 1. Fluid such as water or oil is then circulated through the inner volume 6 of both the upper and lower pressure chambers 1, 2. This circulating fluid is provided at an elevated temperature and pressure. Because the fluid in each pressure chamber is at an elevated pressure relative to ambient pressure the elastic walls of the pressure chamber are forced out and deformed over the adjacent mould assemblies 7, 9, this results in the compression of the composite lay-up there between. The elevated temperate of the fluid acts to cure/form the resin matrix or bonding medium within the composite lay-up. The pressure within the internal volumes 6 of both the upper and lower pressure chambers 1, 2 maybe at least substantially equal to thereby provide a balanced force on the mould assemblies 7, 9. This allows the moulds to be of a lighter construction and still maintain dimensional accuracy then otherwise would be the case where there is uneven pressure between the pressure chambers 1, 2. The pressure within each pressure chamber 1, 2 can also be cyclically varied or a vibration or pressure wave introduced into the fluid of the pressure chambers by the use of a piston or other type of vibration source attached to the mould assembly itself to thereby apply a vibrating force on the mould assemblies 7, 9. It has been found that this assists in removing air bubbles from the composite lay-up thereby ensuring a more consistent and uniform final composite product. This vibration also enhances the release of the air from the laminate when RTM, RFI, or RST is being employed and the mould is inclined or vertical. This vibration enhances the natural tendency of the air bubble to release from the laminate and rise to the top of the column of liquid resin. The arrangement for circulating fluid at an elevated pressure and temperature and providing a cyclically varying pressure is already described in detail in the Applicant's International Patent Application PCT/AU95/00593 and will not therefore be described herein.

Figure 6:
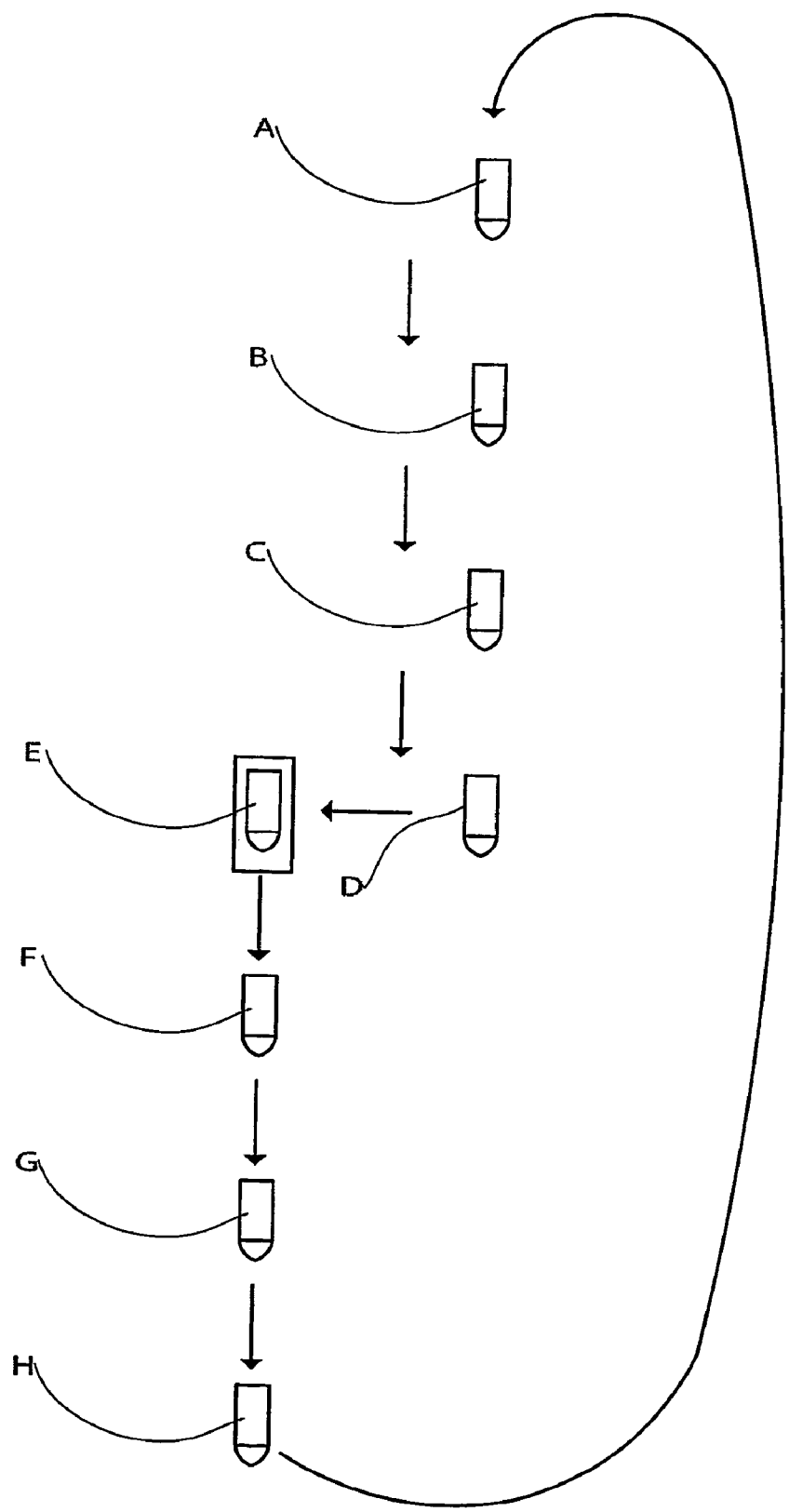
FIG. 6 is a schematic view of a semi continuous production process using the system according to the present invention.

FIG. 6 shows a semi-continuous production process using the composite component production system according to the present invention. The pressure chamber assembly or cell providing the composite or metal bonded components production system is located at Point E of the production flow. The system is shown supporting a mould assembly therein. During the curing cycle process when fluid is circulated through the pressure chambers to allow production of a composite component, another mould assembly can be prepared for introduction into the cell at point D. To more fully describe the production flow the process commences at Point A, the mould assembly is held in a mobile cradle to support it and if necessary rotate it to enable effective access to all the surfaces of the mould assembly. Here the mould assembly is comprised of more than one mould section, the mould assembly is initially prepared with the mould sections being waxed and prepared as so required. At Point B, the mould sections can be sprayed with gel coat and resin if applicable. At Point C, the lower mould section is loaded with a composite layer which may include resin impregnated material (known as "prepreg"), reinforcement material foam cores and dry fibres as so required. At Point D, the upper mould section, vacuum bag, or, a lid or separate mould to spread the load is located over the lower mould section, or the mould is simply left open to be compressed by the elastic wall of the opposing pressure chamber. The final mould assembly is then ready for location between the pressure chambers at Point E. Resin lines may be inserted into, on or on the outside of the mould sections dependent upon the application to allow for the supply of resin matrix or bonding mediums such as resin, or the draining of any excess resin matrix or bonding medium as so required. Following the production/curing of the composite component at Point E, the mould assembly is removed from between the upper and lower pressure chambers and returned to its holding cradle at Point F where the lid, top mould, or vacuum bag, or resin lines, etc, dependent upon application are removed along with all the disposable moulding materials, peel ply, bleeder cloth, etc if applicable to that application. It should be noted that it is envisaged that no disposable materials will be required when the process is operated using RTM, RFI, or RST as a neat part should result from the process. At Point G, additional reinforcements stiffeners, strongbacks and bulkheads and interiors may be located and bonded within the boat, as required; preferably this employs the bonding and joining process as set out in the Applicants' abovenoted international patent application, PCT/AU01/00224. In addition the deck still within its mould assembly can also be bonded onto the hull before the hull is removed from the mould. Finally, at Point H, the completed composite part is removed from the mould sections. In general this will require the moulds to be split and the boat removed from the mould. The moulds are then returned to Point A where they are once again cleaned, rejoined and prepared for the moulding curing process.

FIGS. 7 to 11 show in more detail a possible manufacturing sequence using the production process according to the present invention where mould sections having a sprayed resin layer using RST applied on the mould surface are used.

Figure 7:
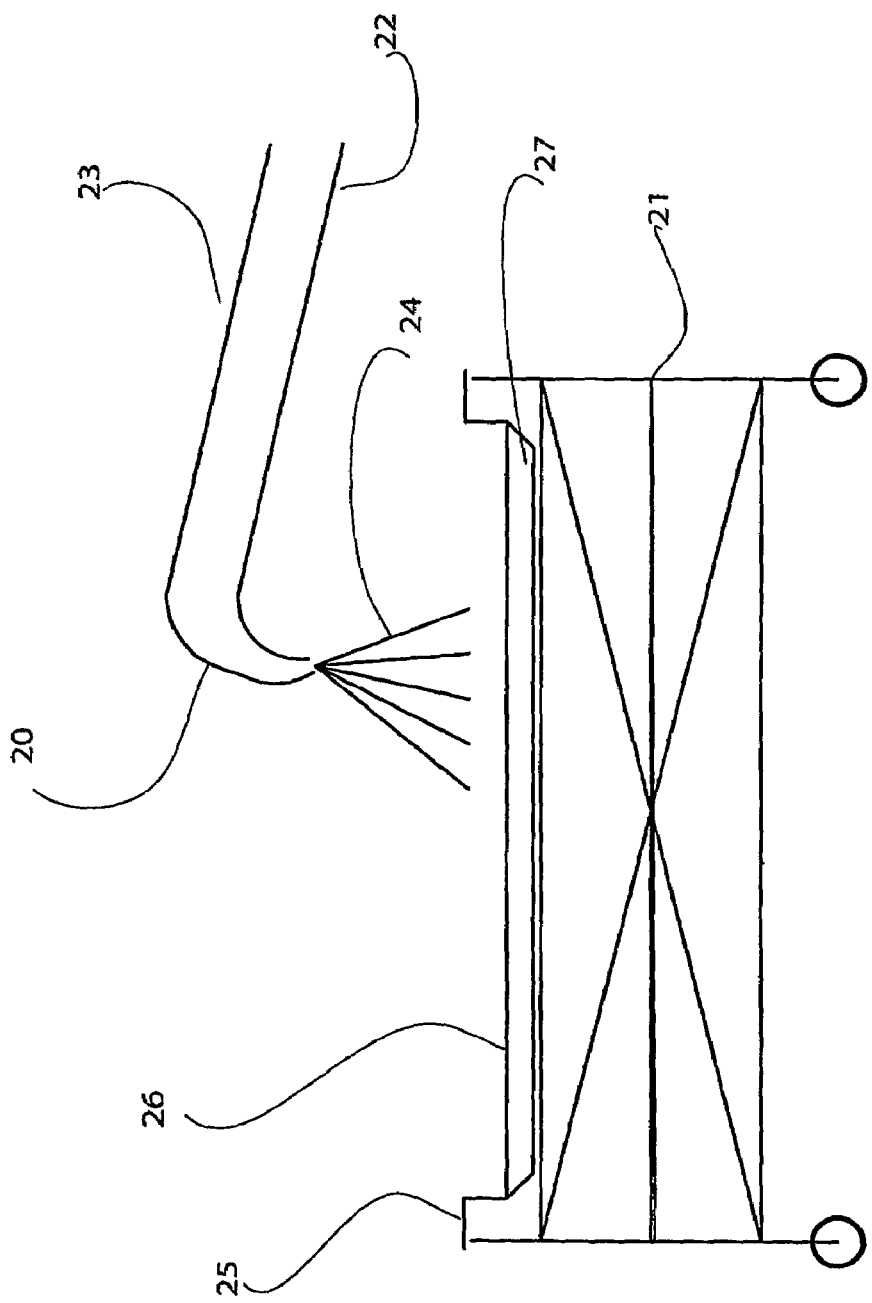
FIGS. 7 to 10 are schematic cross-sectional views show in more detail the production process according to the present invention utilizing a mould section with a resin layer on the mould surface.

Referring initially to FIG. 7, a mould section 25 is supported on a movable trolley 21. The mould section 25 includes a mould surface 26 upon which a composite lay-up will eventually be positioned. Prior to the laying of the composite lay-up, a spray head 20 is used to spray liquefied resin 24 over the mould surface 26. The spray head sprays a mixture of resin and a catalyst respectively supplied by separate supply lines 22, 23 to the spray head 20. The mixed resin and catalyst coalesces as it leaves the spray head and contacts the mould surface 26. The mould section 25 can include cooling passages or cavities 27 or a separate cooling bladder sited on the trolley in contact with the mould immediately under the mould surface 26 to help maintain that mould surface at a lower temperature than that of the resin exiting the spray head. This helps to solidify the resin on the mould surface 26 to thereby provide a resin layer thereon. The resin can be sprayed onto the mould surface in a predetermined pattern to provide varying thickness of the resin layer on the mould surface 26. This is particularly useful when the composite lay-up is in the form of a "prepack" of fibres and foam. Such prepacks can typically include components such as attachment lugs and so on which are prelocated in the prepack in the position where the component will be located in the final product.

Figure 8:
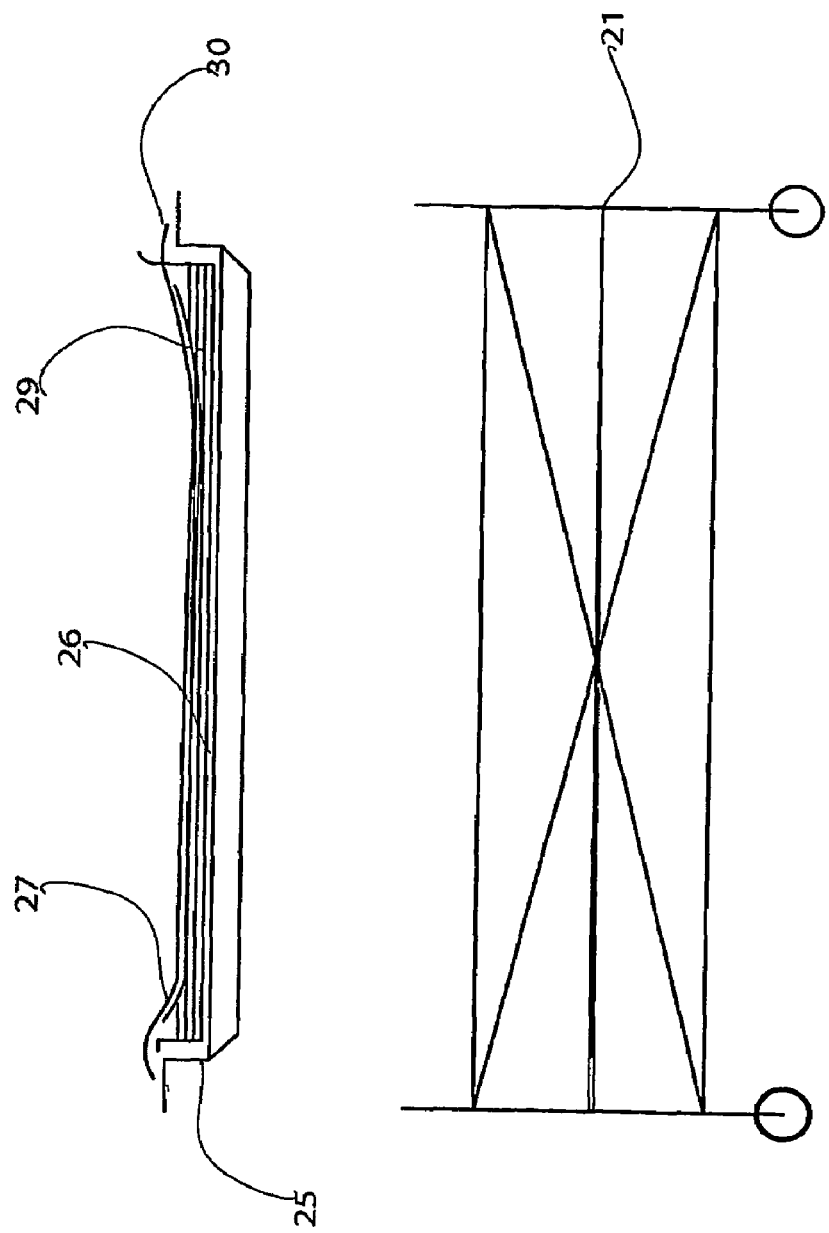
Figure 9:
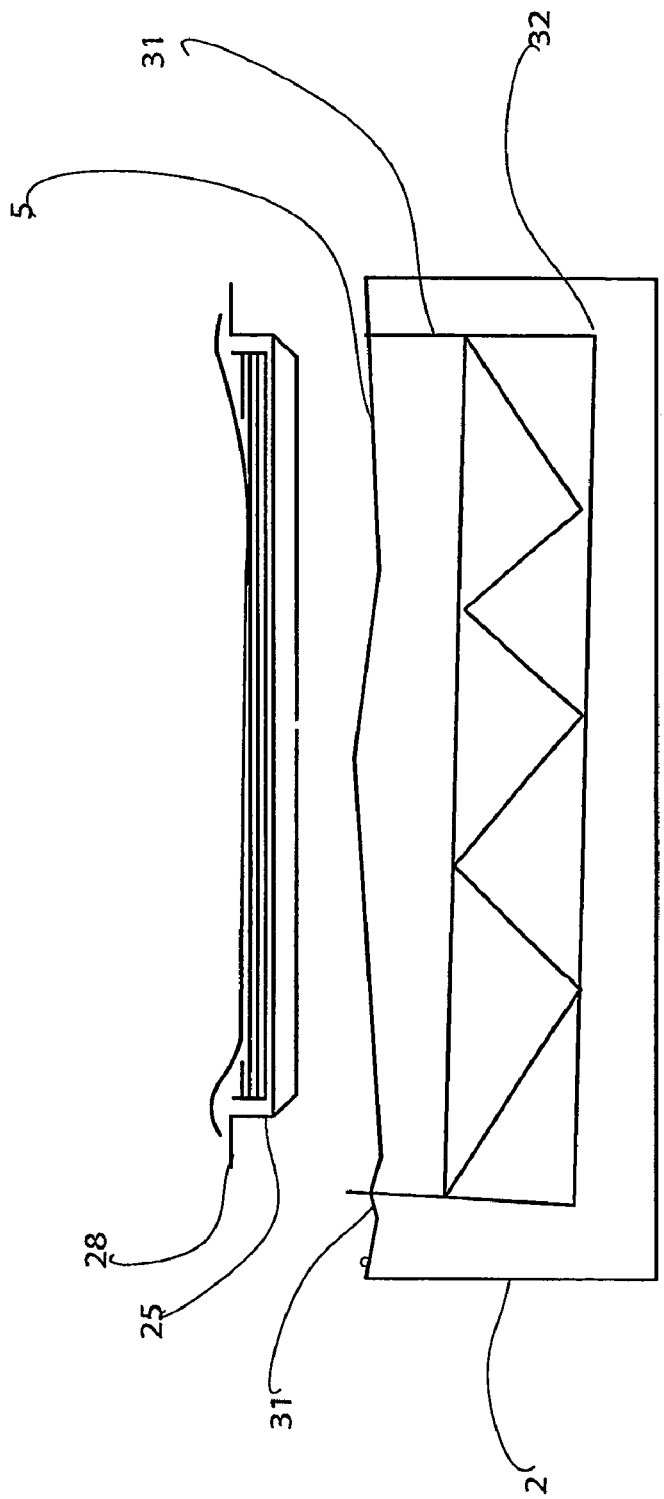

Referring to FIG. 8, once the prepack 29 is located on the mould surface 26 over the resin layer, a vacuum film 30 is located over the top of the mould section 25. This vacuum film 30 is sealed to the mould section 25 so that air can be evacuated from under the vacuum film 30. This helps to minimize the amount of air and other gases located within the prepack. The prepared mould section 25 can then be lifted off the trolley 21 as shown in FIG. 8 and located on the elastically deformable chamber wall 5 of a lower pressure chamber 2. Located within that pressure chamber 2 is a support frame 32 which is not physically connected to the main housing 3 of the bottom pressure chamber 2. Extending from the support frame 32 are a plurality of locating pins 31 which extend through the chamber wall 5. These pins are adapted to engage a series of apertures provided along the flange 28 of the mould section 25 to securely locate that mould section 25 on the chamber wall 5.

As the lower pressure chamber 2 is inclined at an angle relative to the horizontal plane, the support frame 30 and locating pins 31 help to locate the mould section 25 in position on the chamber wall 5.

Figure 10:
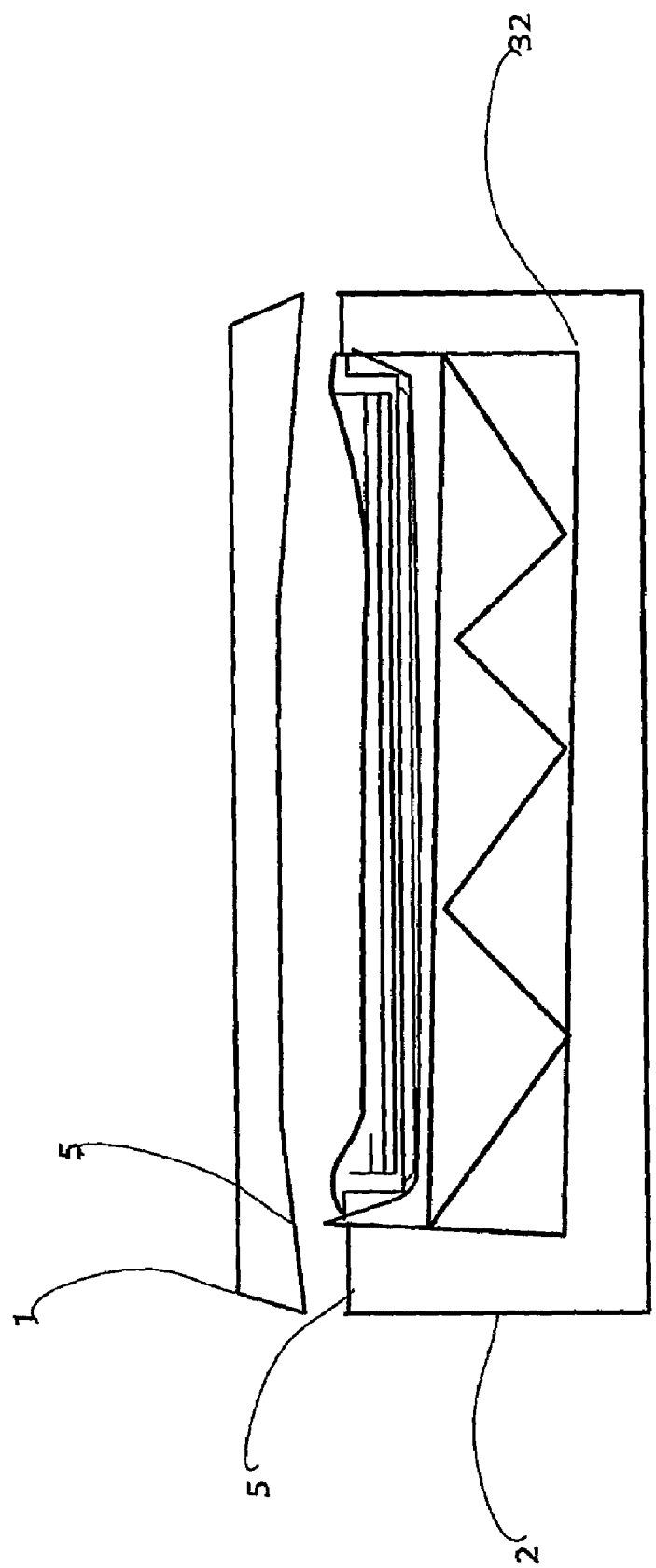

Referring now to FIG. 10, the top pressure chamber 1 is then located over the bottom pressure chamber 2 with the mould section 25 located therebetween.

The apparatus according to the present invention can then operate in the manner previously described to compress and cure the preform or composite lay-up. It is however preferable to vary the temperature of the fluid passing through the bottom and top pressure chambers 1, 2 as this helps to ensure uniform transfer of resin into the prepack. It is preferable to initially apply heat to the prepack to prepare that prepack for wetting by the resin. The warming of the prepack facilitates the flow of the resin therethrough. This can be achieved according to the present invention by circulating higher temperature fluid through the upper pressure chamber 1, while maintaining the fluid circulating through the lower pressure chamber 2 at a relatively lower temperature.

Once the prepack 29 has been properly heated, warmer fluid can be passed through the bottom pressure chamber 2 to heat the mould section 25 and therefore the resin layer thereon. The heating of the resin layer results in the liquefication of that layer and the subsequent wetting of the adjacent prepack via that resin. Because the prepack has been preheated, this results in more ready transfer of resin into the prepack. It is envisaged that the resin will be heated and liquefied at the base of the mould first so as to provide a heat transfer effect from one side of the prepack to the other to fully melt and liquefy any resin within the prepack. Also as the resin melts and reduces its viscosity it will fully fill the prepack with resin. It is most advantageous to commence this process at the lowest point within the mould to drive the air and other gasses in front of the advancing melt line and upwards towards the top of the resin column and the top of the mould.

The sequential heating during the production process enhances the natural tendency of the laminate and resin column to release air and have it rise to the top of the resin column where the pressures are balanced, these two natural phenomenon minimizes the possibility of the slumping or wicking of the resin that can occur if the resin is liquefied too early leading to improper wetting of the prepack. It may also be beneficial to provide a Kevlar veil between the resin layer and the prepack prior to insertion into the mould section 25 between the pressure chambers. This veil includes a plurality of apertures which are sized to prevent the transfer of resin therethrough until the resin is at the right viscosity to properly wet out the prepack. If the resin is too viscous, this can result in dry spots in the prepack and therefore improper wetting of that prepack. The use of the Kevlar veil therefore ensures that the resin is at a low enough viscosity to readily wet the prepack.

Figure 11:
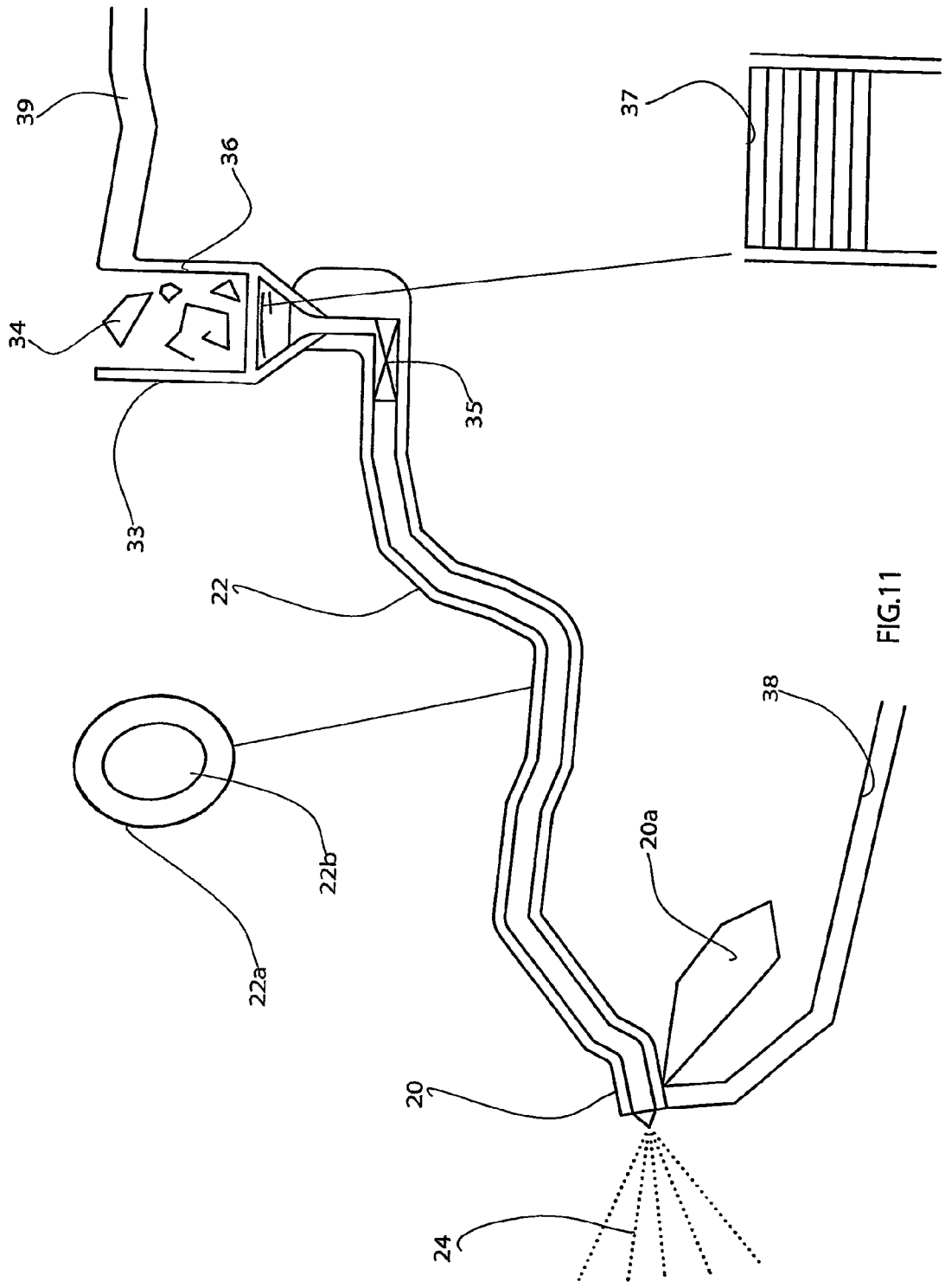
FIG. 11 is a schematic view of a resin spraying apparatus for the production process of FIG. 7 to 10.

FIG. 11 shows in more detail the resin spray apparatus used to spray the resin onto the mould assembly.

A resin hopper 33 is used to melt the resin for the spraying process. The resin 34 is obtained in block form. Such resin is typically relatively low in cost to purchase and of the long chain resin type. This type of resin is tougher than that typically used in RTM. Furthermore, solid resin products have an extended shelf life when compared with liquid resin. A resin pump 35 is located downstream of the hopper 33 to deliver liquefied resin to the resin supply line 22 and spray head 20.

The hopper 33 is provided with hollow walls 36 through which fluid from the fluid circulation system used to supply fluid to the pressure chambers can be circulated. Tubes 37 can alternatively extend around the hopper 33, and fluid can be circulated though these tubes 37.

The resin supply line 22 includes an outer conduit 22a and an inner conduit 22b located within and at least generally concentric with the outer conduit 22a. The resin flows though the inner conduit 22b while fluid is circulated through the outer conduit 22a. The outer conduit 22a also extends about the spray head 20. Therefore, when resin is required to be sprayed by the apparatus, fluid at elevated temperature is supplied through a supply line 38 which is connected to the outer conduit 22a of the resin supply line 22 and through the hollow wall 36 or fluid tubes 37 of the hopper 33, the fluid returning through a fluid drain line 39. This fluid circulation arrangement provides uniform heating along the supply path of the resin and eliminates any hot spots that can arise if electrical heating is used. The spray head 20 can then be actuated by a gun handle and trigger control 20 a to emit a resin spring 24 therefrom.

When no resin spray is required, fluid at a lower temperature is circulated through the apparatus to prevent curing of the resin retained therein.

The spray head 20 has a discharge aperture which can be controlled electronically to provide resin sprays of varying widths. This enables the spray head 20 to deliver narrower and wider resin sprays as the spray head traverses the mould.

As previously noted, the present invention utilizes a "balanced density" effect which allows the mould assembly to be mounted at an inclination or even vertically. This enables the system according to the present invention to produce panels in vertical mould assemblies of far larger size than when using conventional manufacturing processes. This effect is described with reference to FIGS. 12 and 13.

Figure 12:
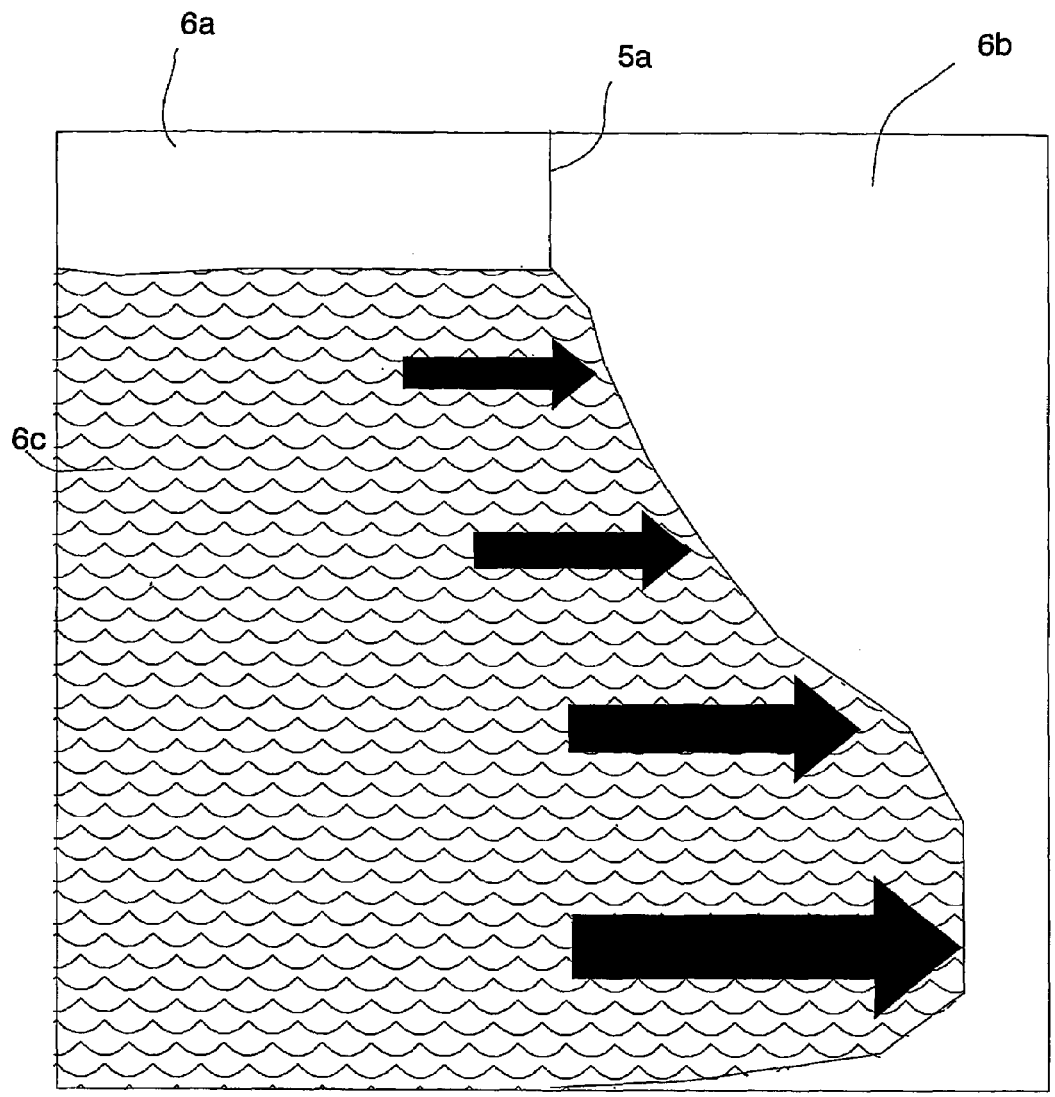
FIGS. 12 and 13 illustrate the principle of the balanced density effect.

FIG. 12 is a representation of the interface between a resin containing volume 6a and air containing volume 6b separated by a flexible diaphragm, 5a. The diaphragm 6b is held in a vertical position but is forced to bulge out into the air volume 6b, as the resin containing volume 6a is progressively filled, the bulge being the greatest near the bottom. This is because of progressively increasing pressure against the wall 5a with depth due to the weight of the column of resin 6c. The reason for this is because the density of the air is less than that of the resin. The pressure of the air applied against the diaphragm 5a is insufficient to compensate for the pressure applied by the resin column 6c resulting in distortion of the diaphragm 5a.

Figure 13:
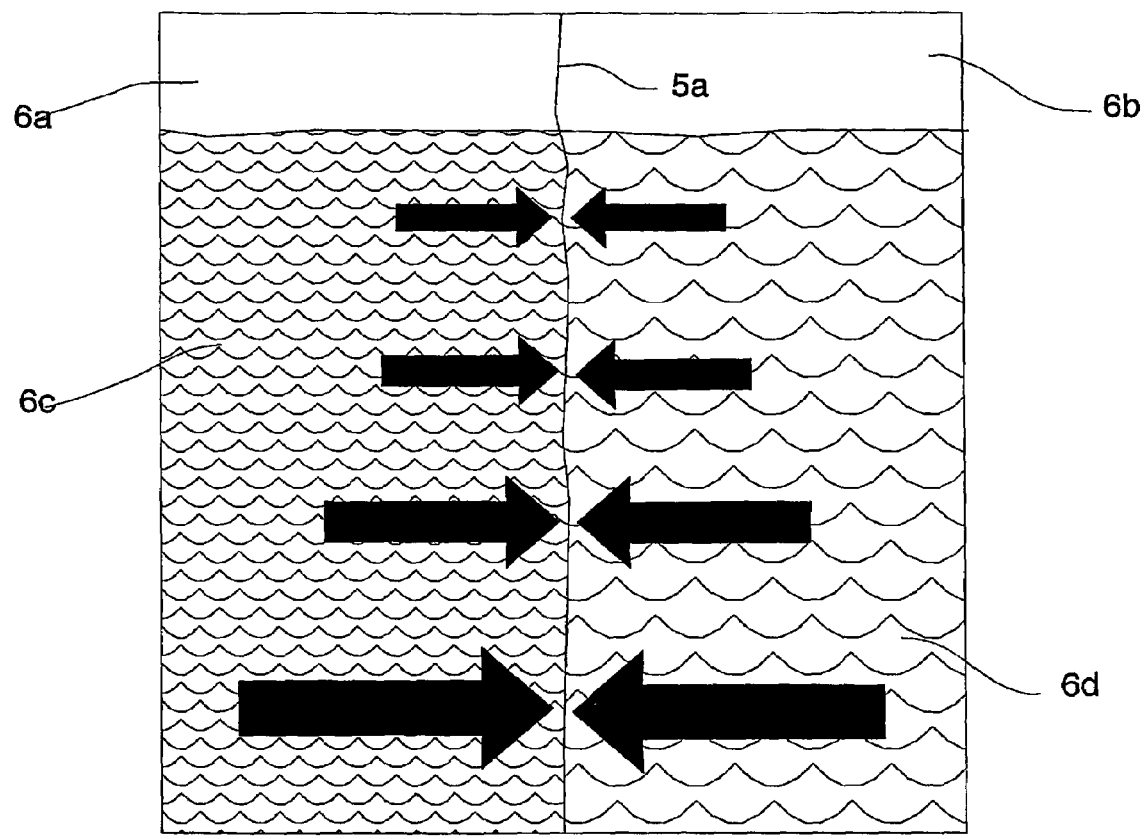

FIG. 13 is a representation of the interface between the resin containing volume 6a, for example a mould cavity containing a lay-up, and a fluid containing volume 6b, for example, the pressure chamber. The flexible diaphragm 5a separating the two volumes is for example provided by the elastically deformable chamber wall of the pressure chamber. Because the fluid is typically oil, the density of the fluid is similar to the resin. Therefore, while the pressure applied by both the resin column and the fluid column against the diaphragm increases with increasing depth therein, there is no bulge in the diaphragm 5a. This is because the respective pressures applied by the resin and fluid columns against the diaphragm 5a are balanced. Therefore, the circulation of fluid in the pressure chambers according to the present invention can utilize this balanced pressure effect allowing the mould assemblies to be inclined or held vertical with minimal distortion to the chamber walls.

Figure 14:
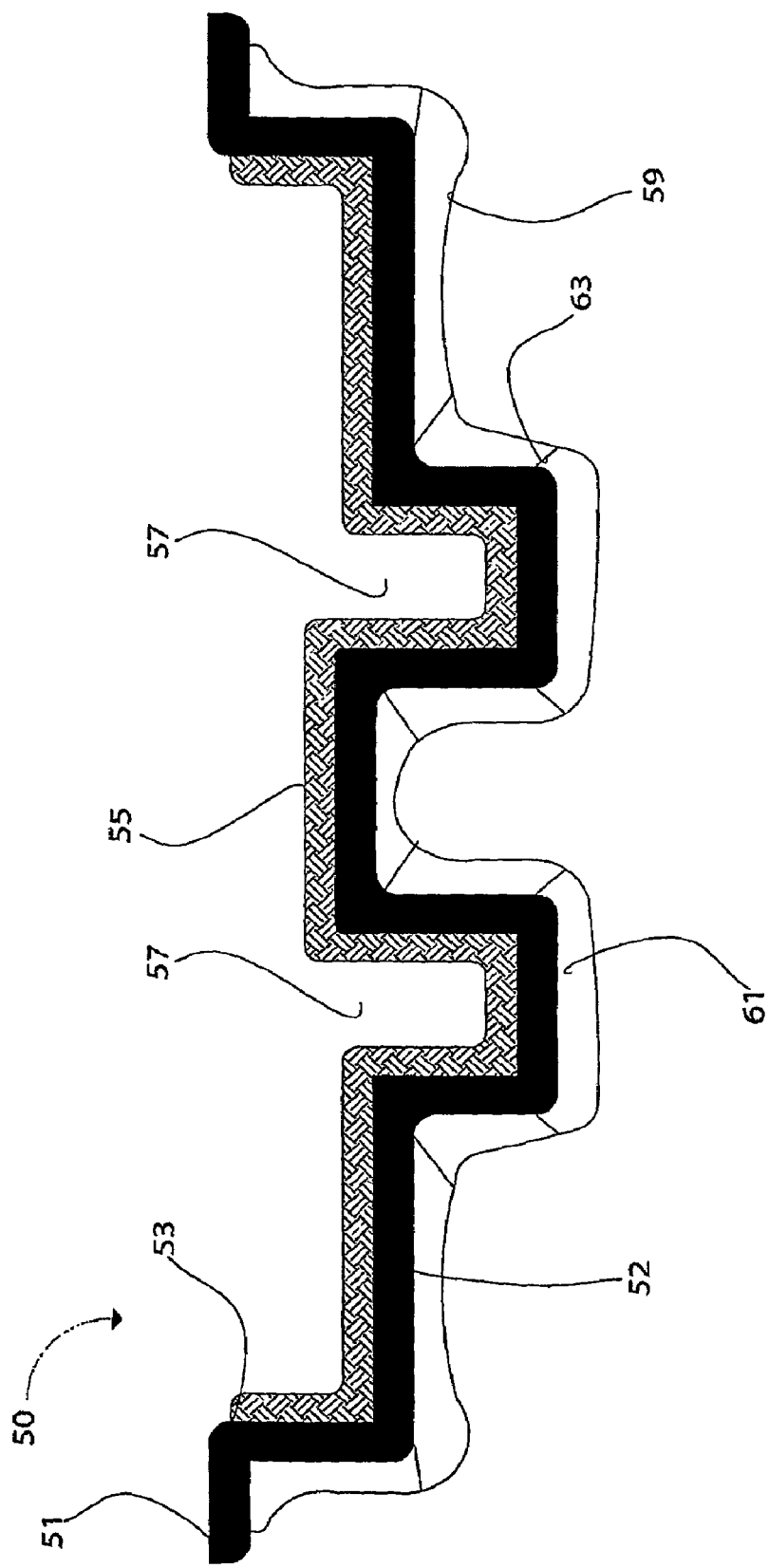
FIGS. 14 is a schematic cross sectional view of a mould assembly having a fluid flow chamber according to the present invention.
Figure 15:
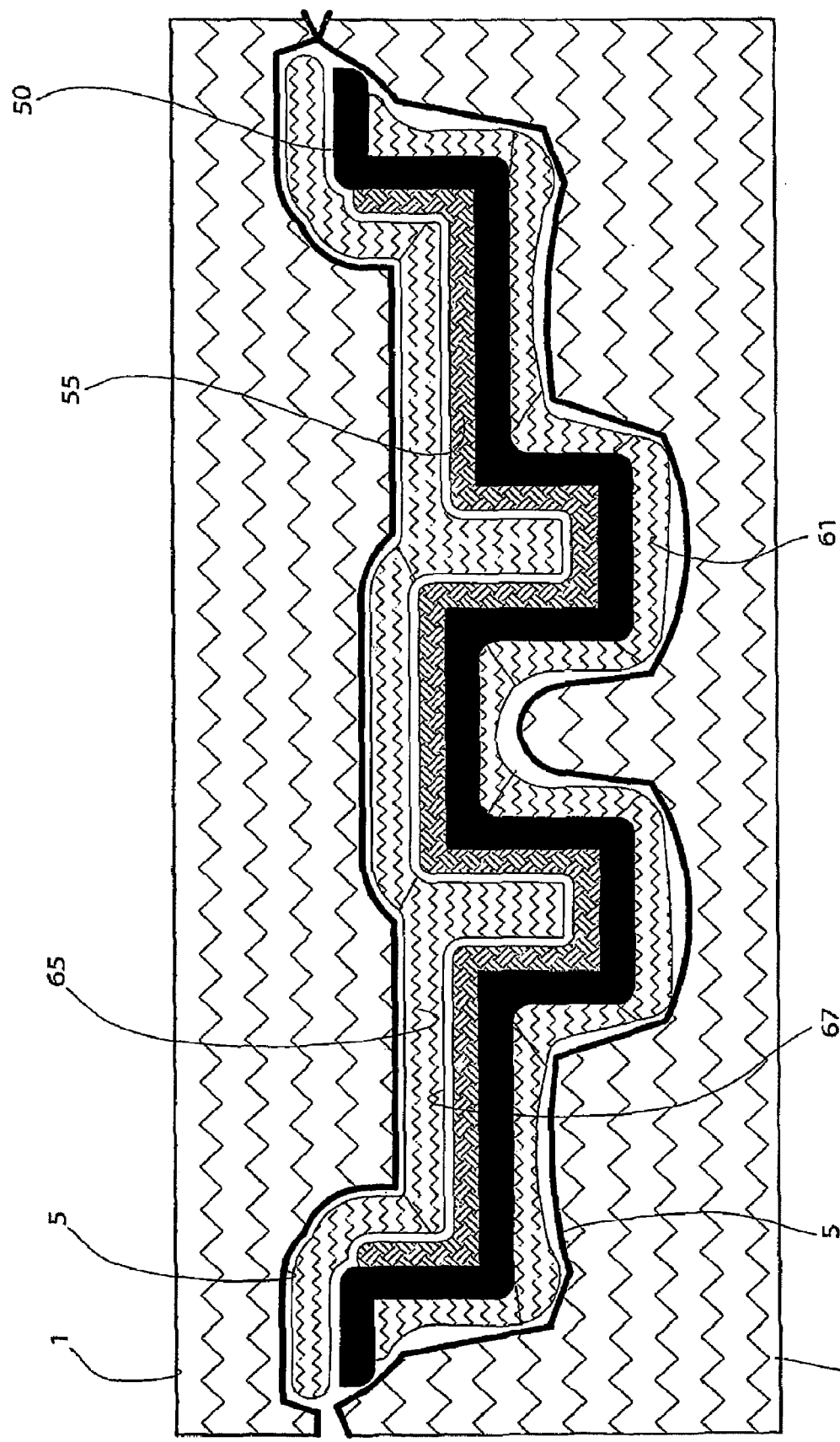
FIG. 15 is schematic view of the mould assembly of FIG. 14 located between pressure chambers according to the present invention.

FIGS. 14 and 15 show details of another preferred embodiment of the system according to the present invention. Corresponding reference numerals to the earlier embodiment are used in these figures and in subsequent figures for clarity reasons.

FIG. 14 shows a mould assembly 50 including a mould section 51 having a mould cavity 53 within which is supported a composite or bonded metal lay-up 55. This mould assembly includes two relatively deep channel portions 57. Unlike the arrangement shown in FIG. 1 only a single mould section is provided. There may be an initial compression of the lay-up 55 using a vacuum film as previously described and shown in FIG. 8.

The deep channel portions 57 and the various ninety degree angles in the cross section of the mould portion 51 makes it difficult for the chamber walls 5 of the pressure chambers 1, 2 completely contact all the areas of the mould assembly 50. The result is potentially less than satisfactory compression and curing of the lay-up 55 because the heat and pressure has not been evenly applied thereto.

Therefore, mould assembly 50 further includes a bladder 59 formed of elastically deformable material and secured to the mould section 51 to thereby provide a fluid flow chamber 61. Support membranes 63 interconnect the bottom mould section face 52 with the bladder 59, This bladder includes means (not shown) to allow fluid at elevated temperature and pressure to be circulated through the fluid flow chamber. This therefore allows for a direct contact of the circulating fluid to the bottom mould face 52 ensuring a more efficient and uniform heat transfer to the mould section 51 and lay-up 55.

It is also envisaged that the fluid flow chamber be provided by a rigid or semi-rigid housing or plate having a rigid face, the housing or plate being resiliently attached along it's periphery to the mould section 51. Support membranes may interconnect to the housing or plate and the mould section face 52 to thereby help to guide the fluid flow through the fluid flow chamber.

Referring now to FIG. 15, during the production process for the composite or bonded metal component, the mould assembly 50 is accommodated between the chamber walls 5 of a top and bottom pressure chamber 1, 2. A further top fluid flow chamber 65 can overlay the mould assembly 50 when located between the pressure chambers. This top fluid flow chamber 65 is in the form of a bladder formed of elastically deformable material. The lower face 67 of the top fluid flow chamber 65 is configured to generally conform with the shape of the mould assembly 50. This top fluid flow chamber 65 also includes means (not shown) for circulating fluid at elevated temperature and pressure therethrough.

This arrangement ensures that there is a relatively uniform pressure and temperature distribution across the surface of the mould assembly 50 and the lay-up 55.

The advantage of this arrangement over the earlier described embodiment is that there is now a separation of purpose between the pressure application function of the pressure chambers 1, 2 and the temperature control function of the mould assembly fluid flow chamber 61 and top fluid flow chamber 65. The relatively smaller volume of the fluid flow chambers 61, 65 result in a smaller volume of fluid being required to achieve the temperature changes for the production process while at the same time maximizing the heat transfer to the lay-up 55. The function of the pressure chambers 1, 2 is then to apply the pressure for compressing the lay-up 55. The temperature within the pressure chambers 1, 2 can therefore be maintained at a constant temperature.

The embodiment of the production system shown in FIG. 15 utilises a top fluid flow chamber 65 having a configured bottom face 67. It is however also envisaged that the chamber wall 5 of the top pressure chamber 1 could alternatively be configured to at least generally conform with the general shape of the mould assembly 50.

FIGS. 16 to 19 show alternative location means for locating a mould assembly 70 on the chamber wall 5 of a lower pressure chamber 2. The location means acts to hold the mould assembly 70 in a predetermined position on the chamber wall 5 to keep the mould assembly rigid.

Figure 16:
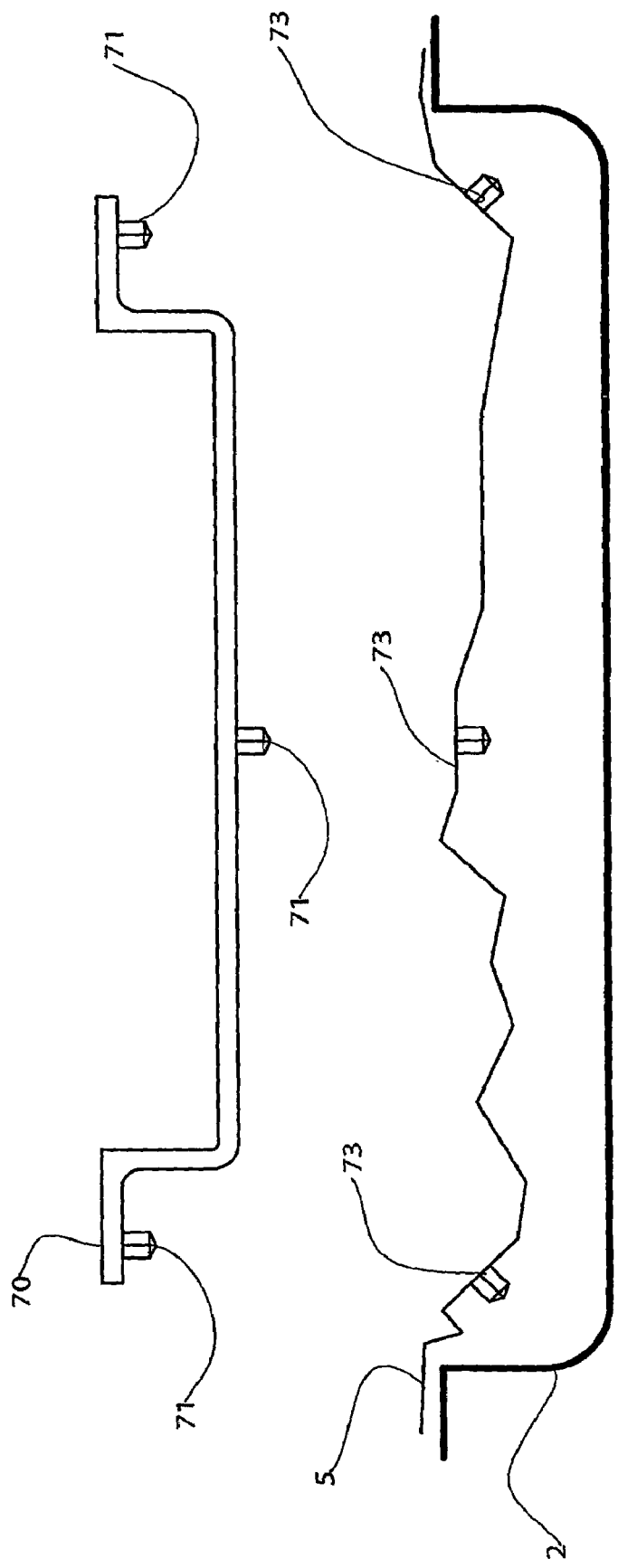
FIGS. 16 to 19 are schematic views of alternative means for locating a mould assembly on a chamber wall.

In the embodiment shown in FIG. 16, the mould assembly 70 is provided with a number of lugs 71 which engage corresponding sockets 73 located on the chamber wall 5.

Figure 17:
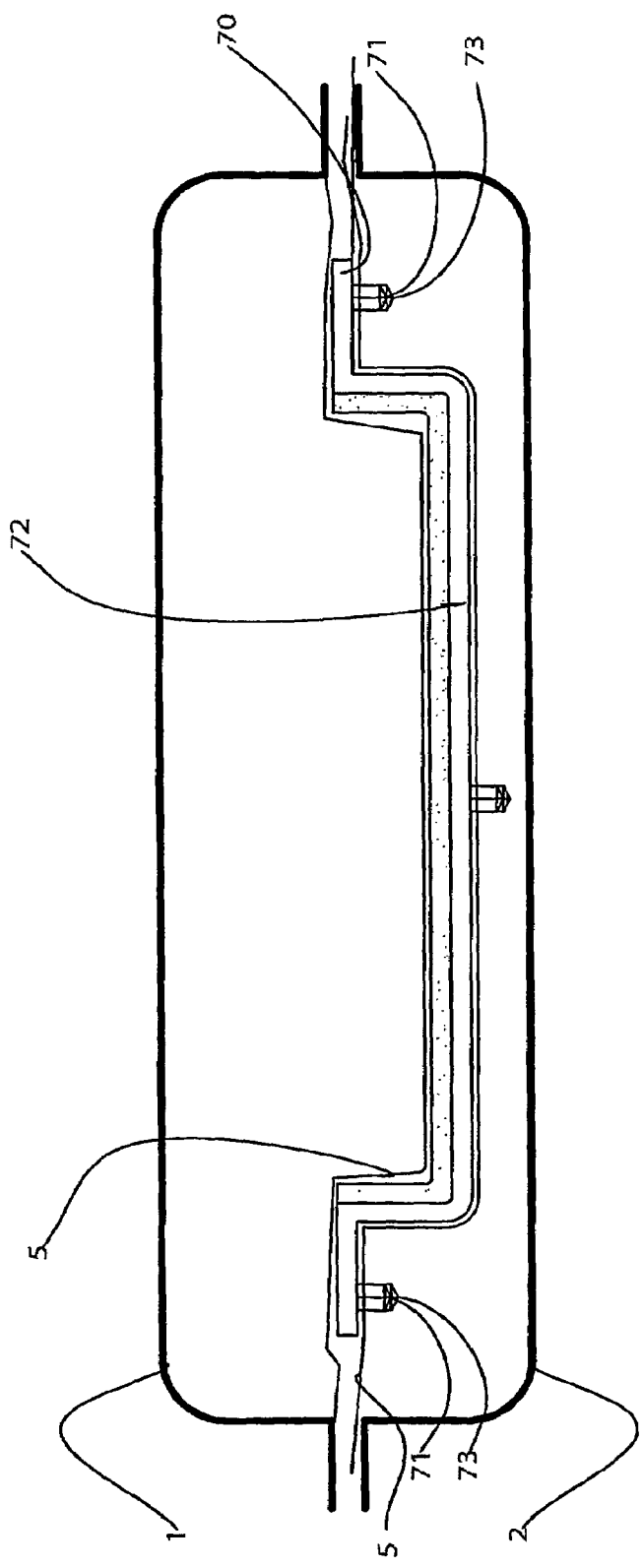

FIG. 17 shows the mould assembly 70 supporting a lay-up 72 therein, located between top and bottom pressure chambers 1, 2. The lugs 71 of the mould assembly 70 engages the sockets 73 supported on the bottom pressure chamber 2. The chamber wall 5 of the top pressure chamber 1 is deformed into the mould assembly 70 when fluid at elevated temperature and pressure is circulated through the top pressure chamber 1. The chamber wall 5 of the bottom pressure chamber 2 is similarly deformed about the bottom of the mould assembly 70 due to circulating fluid passing therethrough.

Figure 18:
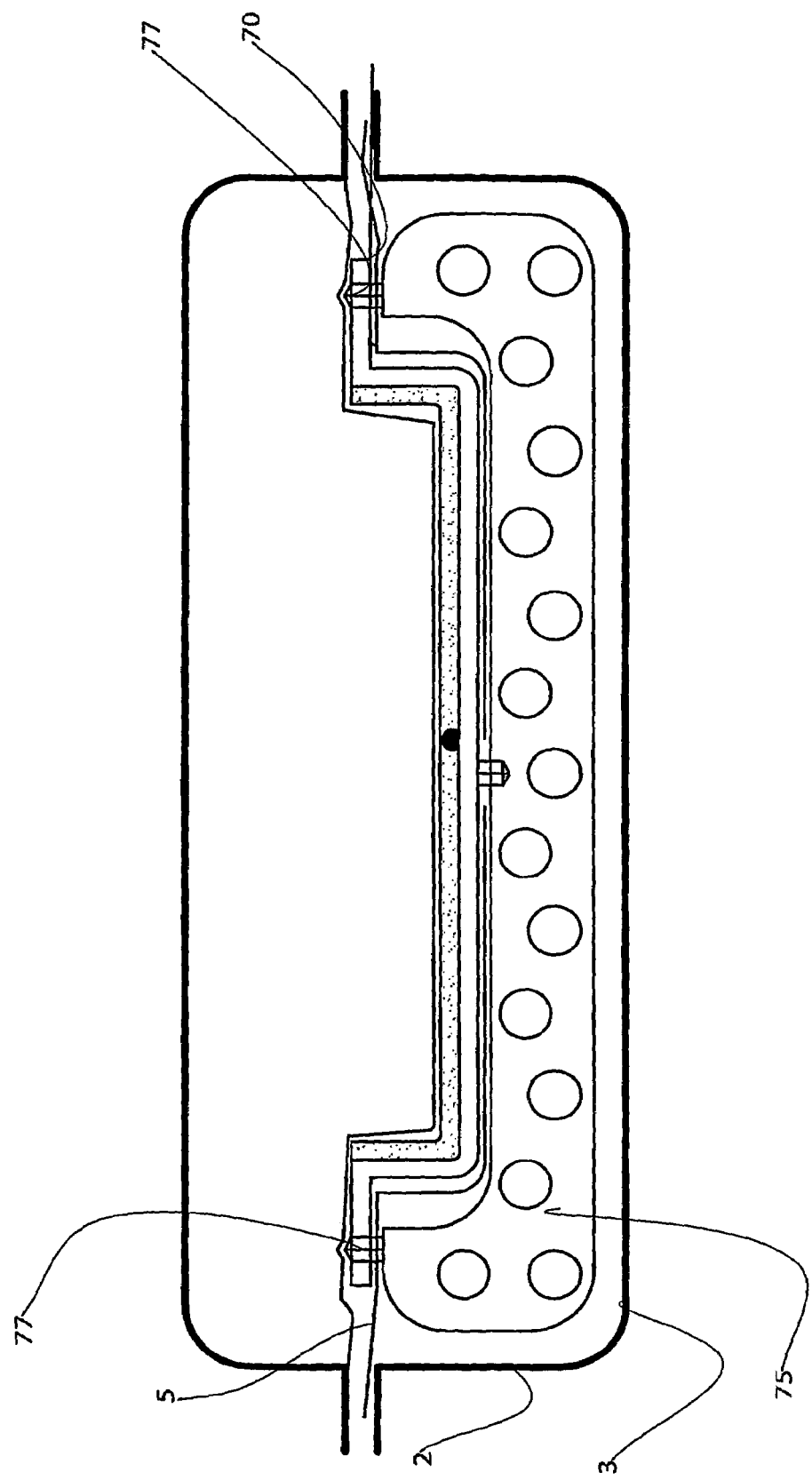

FIG. 18 includes a rigid frame 75 having positioning pins 77 extending through the chamber wall 5 of the bottom pressure chamber 2. This arrangement is therefore similar to that shown in FIG. 9 and 10 and the rigid frame 75 is accommodated within but is otherwise not connected to the housing 3 of the bottom fluid chamber.

The positioning pins 77 can engage corresponding apertures provided along the periphery of the mould assembly 70.

Because the rigid frame 75 shown in FIG. 15 has a relatively shallow profile, the volume within the bottom fluid chamber 2 does not need to be particularly high to accommodate the rigid frame therein.

Figure 19:
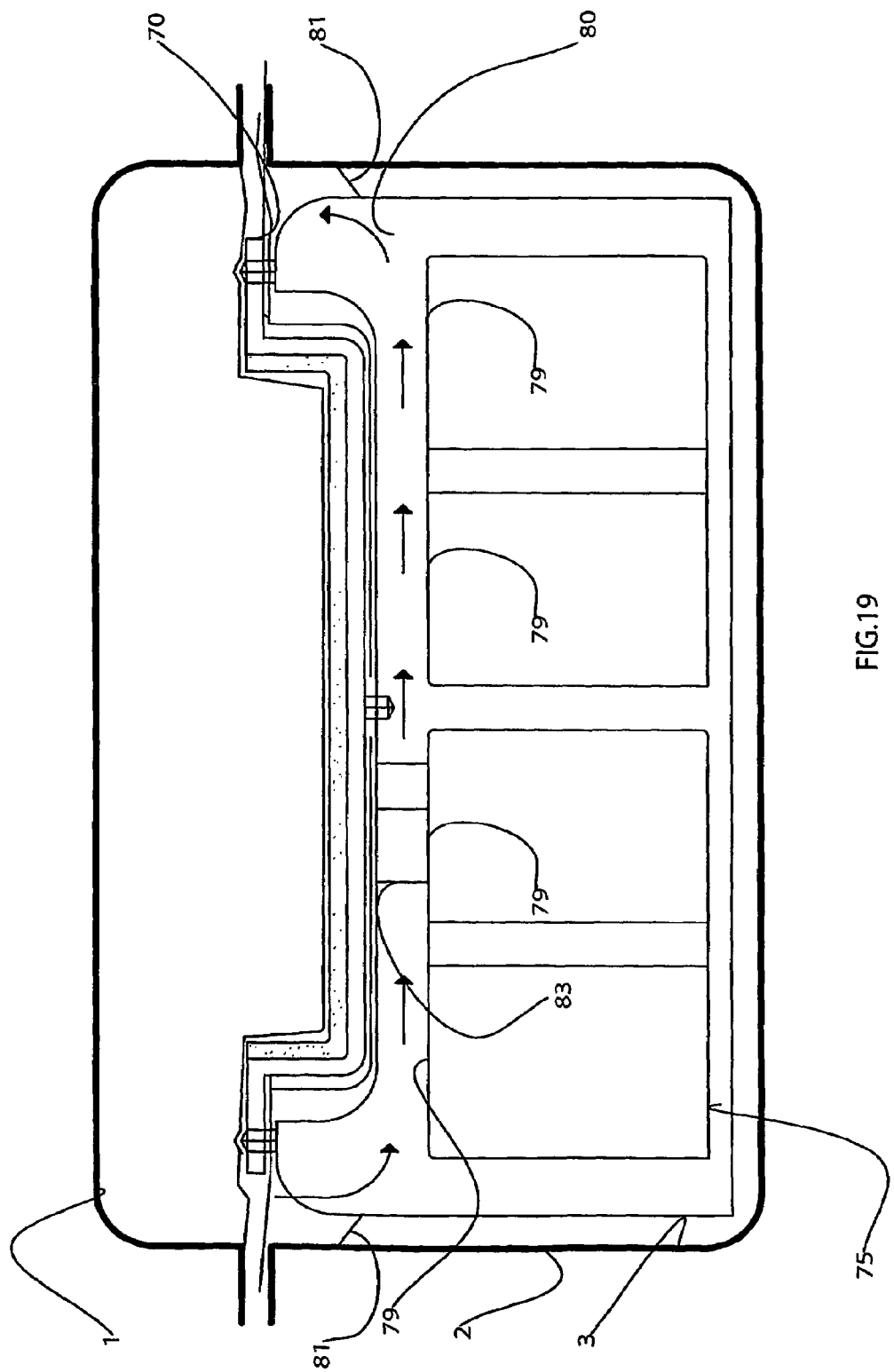

In the arrangement shown in FIGS. 19, the rigid frame 75 supported in the bottom fluid chamber 2 is. substantially larger in size requiring a greater volume in the bottom pressure chamber 2 to accommodate that rigid frame 75. Mould assemblies used in conventional autoclave composite production methods typically have a large rigid frame of the type shown in FIG. 19.

It is not advantageous to circulate a very high volume of fluid through the bottom fluid chamber 2 because excess fluid is not provided for the production process, this excess fluid being unnecessary. Therefore, it is preferable to provide separation plates 79 located near the upper portion of the rigid frame 75 and seals 81 extending from the housing 3 of the bottom pressure chamber and engaging a peripheral face of the rigid frame 75. The separation plates 79 and seals 81 define a narrower fluid flow passage 80 through which circulating fluid is directed to thereby minimize the volume of fluid that needs to be circulated at any one time through the bottom pressure chamber 2, with fluid flowing over the seal 81 and over the separation plates 79. Spacer plates 83 may also be provided within. the defined flow path to assist in correctly positioning the separation plates 79 as well as providing a degree of flow control for the flow passing through the fluid flow passage 80.

The separation plates 79 themselves may be provided by a pair of plates with a peripheral resilient seal provided between the plates and extending along the periphery of said plates. The plates may be urged together, for example by means of a nut and bolt to thereby compress the seal, the seal extending beyond the periphery of the plates to thereby engage the accommodating space within the rigid frame 75.

The remaining volume of the bottom pressure chamber 2 can be filled with material such as rocks or bricks to reduce the volume of fluid that needs to be retained therein.

In all of the abovedescribed arrangements, the mould assembly is held in a floating relationship between the chamber walls 5 of the top and bottom pressure chambers 1, 2.

In another preferred embodiment of the system according to the present invention, as shown in FIGS. 20, 21a and 21b, the mould assembly 17 could be held stationary while the top and bottom chambers 1, 2 are supported in a floating relation about the rigidly supported mould assembly 70. The mould assembly 70 is itself rigidly mounted on a support frame 85. This support frame 85 can be secured to a floor by bolts 87. The mould assembly 70 is supported on the support frame 85 via support pins 77 extending from the support frame 85 and through the chamber wall 5 of the bottom pressure chamber 2.

The bottom pressure chamber 2 includes a peripheral flange 88. The bottom pressure chamber 2 is supported on support posts 89 along its flange 88 with resilient means 91 such as a coil spring being provided therebetween so that the bottom pressure chamber 2 is movable relative to the stationary mould assembly 70. The top pressure chamber 1 rests over the mould assembly 70 and is also free to move relative to the mould assembly 70.

The rigid frame 85 includes a portion which is accommodated within the bottom pressure chamber 2. To this end, the support frame 85 includes a series of frame members 86 which extend through the housing 3 of the bottom pressure chamber, with seals 93 as best shown in FIGS. 18a and b being provided around each frame member 86. Each frame leg 86 includes a flange connection 95 that allows the upper portion 97 of the support frame 85 to be installed within the bottom pressure chamber 2 and subsequently connected via the flange connections 95 to the rest of the support frame 85.

FIGS. 21a and 21b shows in more detail the seal provided around each support frame member 86. This seal 93 includes an annular rubber ring 95. The inner peripheral edge of the annular ring 95 is trapped between a flange 97 fixed on the frame member 86 and a second floating flange 99. The fixed flange 97 and floating flange 99 are bolted together to hold the inner periphery of the annular seal ring 95. The outer periphery of that seal ring 95 is secured between the housing wall 3 and an annular outer ring 100.

During operation of the production system shown in FIGS. 20 and 21a and 21b, fluid at elevated temperature and pressure is circulated through both the top and bottom pressure chambers 1, 2. Because the mould assembly 70 is held rigid, the top and bottom pressure chambers 1, 2 move with the change in pressure in each pressure chamber to thereby balance the overall pressure over the mould assembly 70 and the lay-up 72 located thereon. The resultant product of this system therefore experiences the same uniform temperature distribution and pressure as in the earlier described embodiments and would therefore have similar if not identical physical characteristics to components produced using the earlier described production system.

Figure 22:
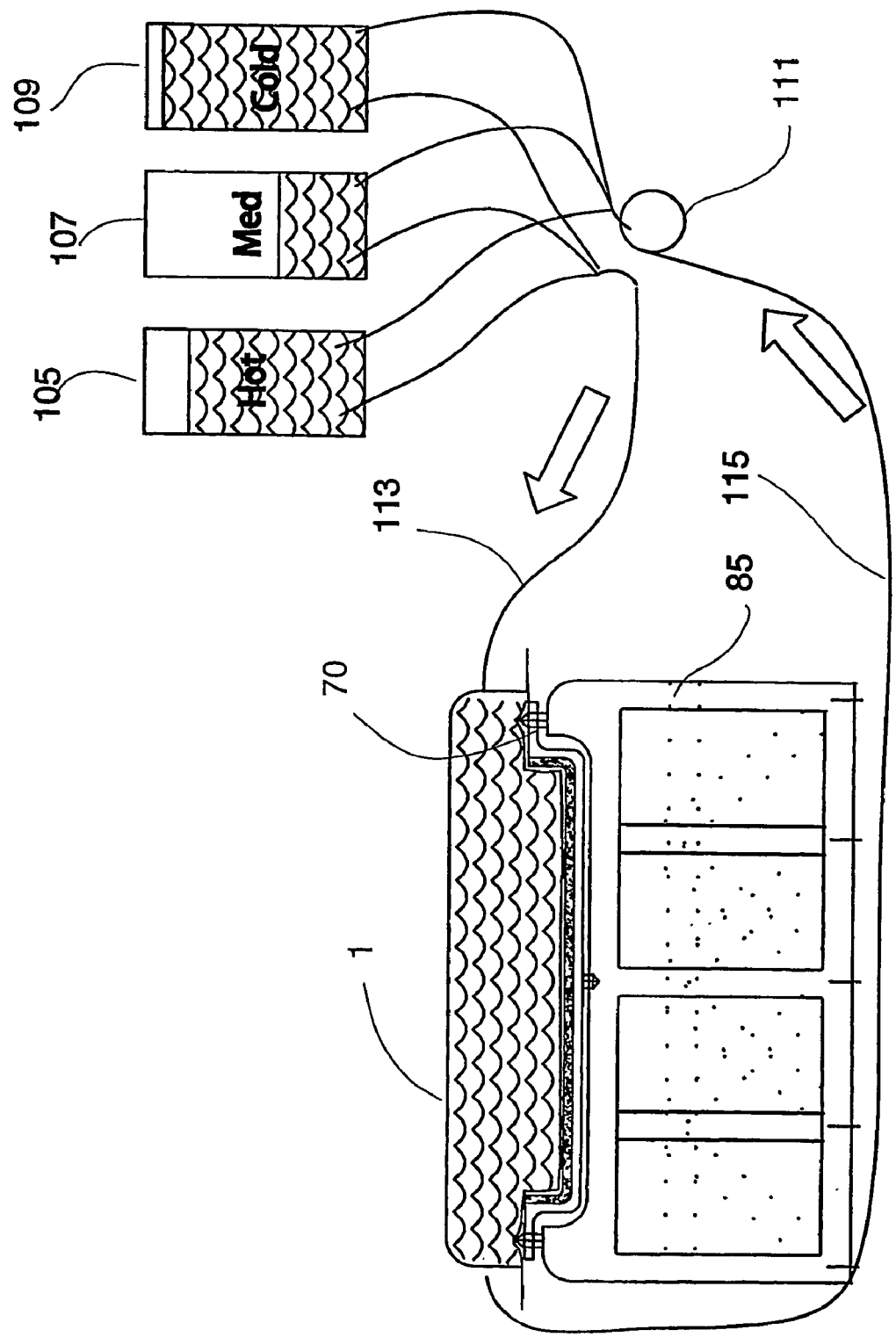
FIG. 22 is a schematic view showing a further embodiment of a production system according to the present invention.

FIG. 22 shows another preferred embodiment of the present invention which is similar to the embodiment of FIG. 17 in having a rigid support frame 85 rigidly supporting a mould assembly 70. In this embodiment however, only a top pressure chamber 1 is provided. In each of the preferred embodiments of the production system according to the present invention, fluid is circulated at elevated temperature and pressure through the production system. The system shown in FIG. 19 similarly provides for the said circulation of fluid through the top pressure chamber 1. A vibration device can be supported on the pressure chamber 1 to thereby vibrate the fluid circulating within the pressure chamber. This cyclic variation of the fluid pressure acts to remove any air bubbles from the lay-up.

The fluid circulation system shown in FIG. 22 includes three fluid reservoirs 105, 107, 109. Each of the fluid reservoirs are pressurized and share the same common pressure. The first fluid reservoir 105 provides fluid at a relatively high temperature whereas the last fluid reservoir 109 provides fluid at a much lower temperature. The middle fluid reservoir 107 provides fluid at a temperature intermediate the fluid temperatures of the first and last fluid reservoirs 105, 109. A series of supply and return lines extend from each fluid reservoir with the fluid being supplied to and return from the top pressure chamber 1 being controlled by means of valves (not shown) and a pump 111. The valves control the temperature of the fluid passing through the fluid supply line 113 to the top pressure chamber 1. A fluid return line 115 returns the fluid back to the respective fluid reservoir. The fluid supply system acts to connect different reservoirs to the top pressure chamber 1 depending on the fluid temperature required at the particular point in the production cycle. The system is described in more detail in the Applicant's International Application No. PCT/AU95/00593.

The first circulation means provides a significant advantage in having very little heat loss during operation with the production systems according to the present invention. Conventional single bladder systems used in composite production require the fluid to be cycled though a range of temperatures. The fluid within the bladder must be initially heated and then allowed to cool. The heat is therefor lost in this process. By comparison, in the single pressure chamber system shown in FIG. 22, the fluid in each fluid reservoir of the fluid circulation system is maintained at a preset constant temperature. When fluid of a certain temperature is required to be circulated through the pressure chamber, the fluid reservoir containing the fluid at the correct temperature is connected to the pressure chamber. A different fluid reservoir is therefore connected as the fluid temperature requires a change in temperatures. There is therefore minimal loss in heat from the fluid contained in each fluid reservoir because the fluid is only circulated through the pressure chamber, the energy required to heat the part is used and the fluid is not cooled. The result is that there is minimal heat loss when running a production system such as that shown in FIG. 22.

The storage of fluid in this manner at conrolled temperatures is the equivalent of the storage of large quantities of energy that can be applied to heating and or cooling the mould and thus the part in the mould. As the fluid is changed, that is returned to the storage tanks, not cycled from cold, to hot to cold, there is only the heat inertia of the moulds and the part to be overcome. This is generally at one tenth to one third of the heat energy of the equivalent mass of water. This approach results in rapid cycle times that would not be available if the high heat inertia of the HTF fluid is required to be overcome by cycleing its temperature from cold to hot to cold. Thus the approach of the separate storage of the heat transfer fluids results in a much faster and more efficient means of curing a part than the present bladder curing system.

The top pressure chamber 1 is held in a floating relation above the mould assembly 70. This arrangement provides many of the advantages of the earlier embodiments and is acceptable for components where dimensional accuracy is not as critical.

Figure 23:
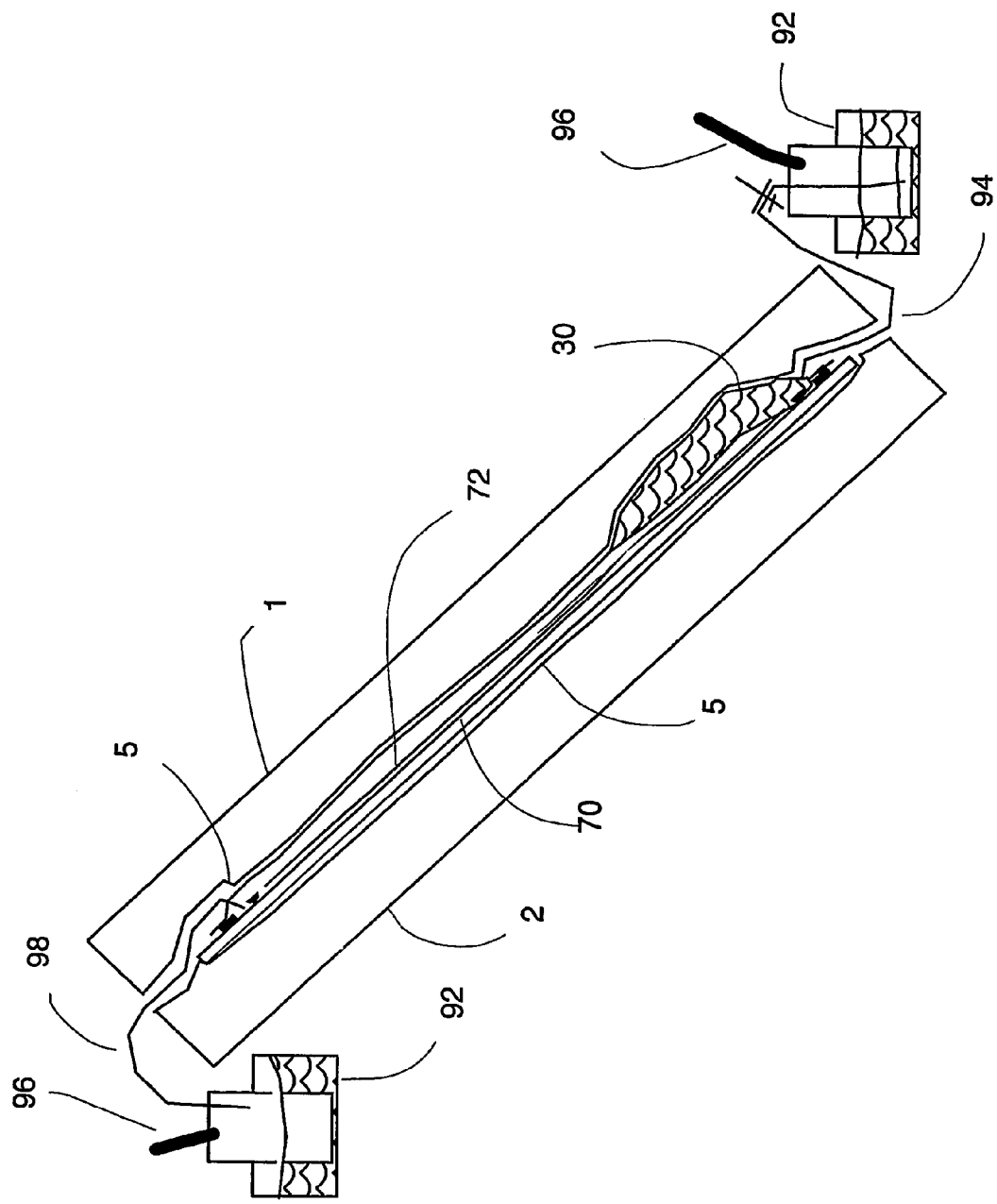
FIGS. 23 and 24 are schematic views showing a resin supply arrangement for systems according to the present invention.
Figure 24:
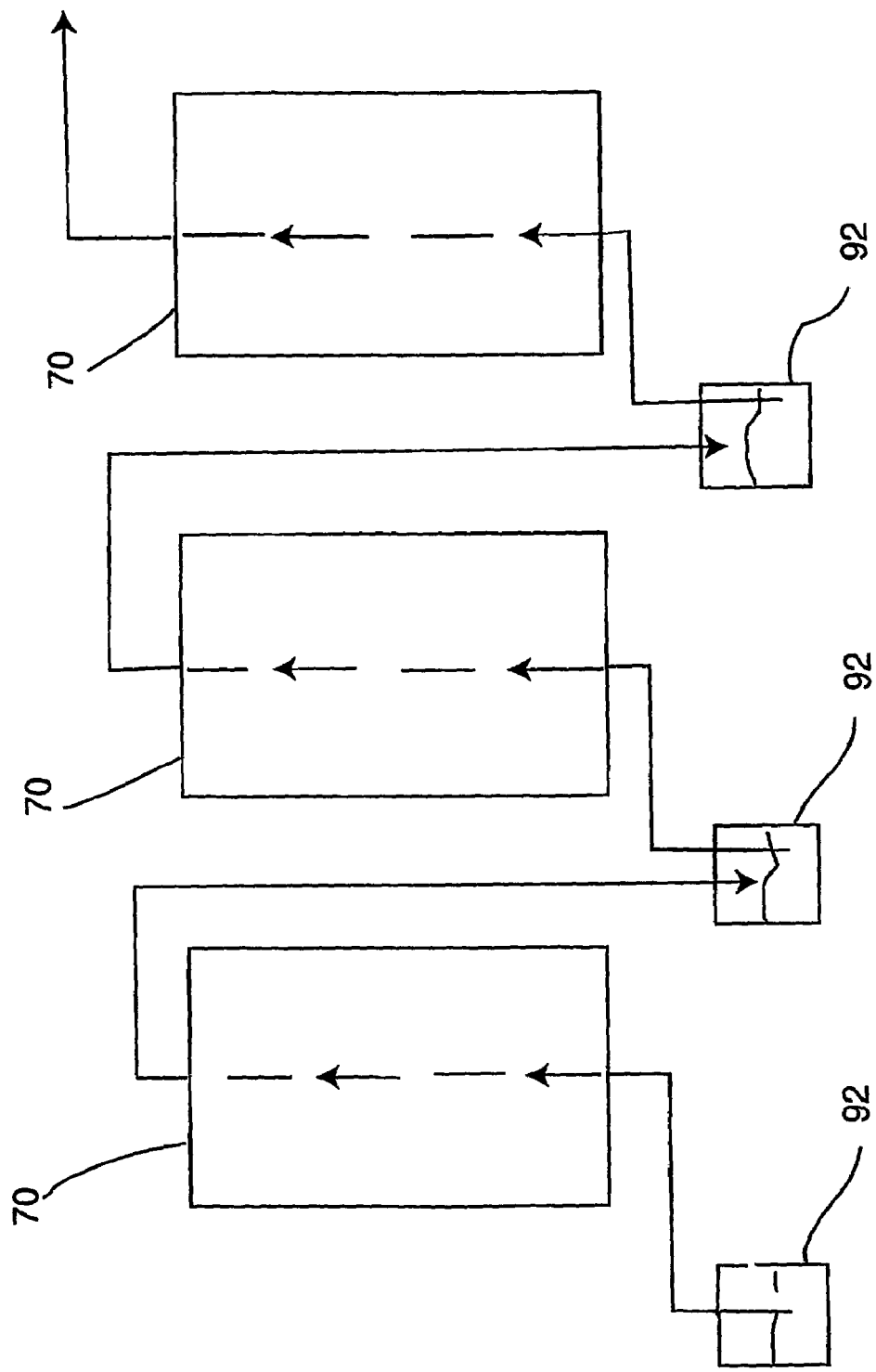

Referring now to FIGS. 23 and 24, there is shown an arrangement which allows resin to be supplied to a number of different mould assemblies in a sequential manner. FIG. 23 shows one such mould assembly 70 supporting a lay-up 72 and located between the chamber walls 5 of two pressure chambers 1,2. The mould assembly 70 and pressure chambers 1,2 are all mounted in an inclined position. A vacuum bag 30 is placed over the lay-up 72, and a resin supply line 94 extends from a first resin container 92. Air pressure forces the resin through the resin supply line 94 into the space occupied by the lay-up 72. As the pressure chambers 1,2 contain fluid, the pressure of the fluid which increases with increasing depth assists in forcing the resin to the top of the slope of the mould assembly. The physical effect is a wave of resin moving up through the lay-up 72. Sufficient resin is supplied to the mould assembly 70 such that there is an overflow of resin out therefrom. This overflow is collected by a resin drain line 98 which delivers this resin to a second resin container 92. A vacuum line 96 holds that resin container in a vacuum to help to draw up the resin.

The resin within the second resin container 92 can then supplied to another mould assembly 70 as shown in FIG. 24. This process can continue sequentially through a number of mould assemblies.

FIGS. 25 to 28 show a number of different configuring arrangements for locating and supporting component parts that need to be bonded to the component being produced. Such components include reinforcement ribs, attachment points, stringers and so on.

Figure 25:
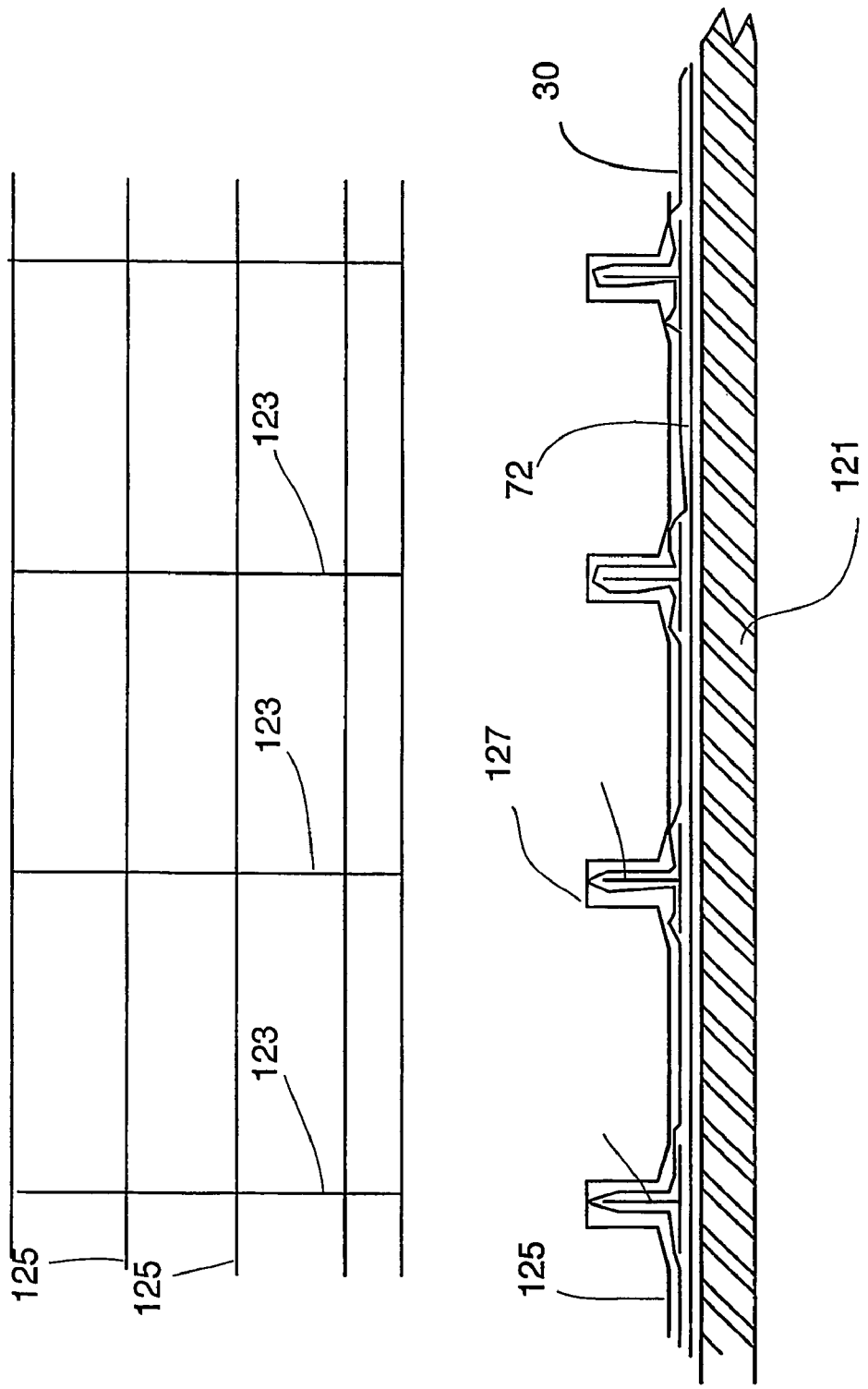
FIGS. 25 to 28 are schematic views showing alternative configuring arrangements for locating component parts on a lay-up.

Referring initially to FIG. 25, there is shown. a mould section 121 upon which is supported a composite or bonded metal lay-up 72. Located on top of the lay-up 72 are a series of parallel reinforcement ribs 123 that are to be bonded to the completed component. A vacuum film 30 is laid over both the lay-up 72 and ribs 123 and a vacuum applied to provide initial compression of the lay-up and to help to hold the ribs 123 in place. A series of configured straps 125 can also be laid over the lay-up 72, ribs 123 and vacuum film 30 to locate and support the ribs 123. Each strap 125 includes a series of "U" shaped bends 127 which can engage the upstanding portion of the ribs 123. These straps 127 hold the ribs 123 in position while the elastically deformable chamber wall engages and applies pressure to the complete assembly.

Figure 26:
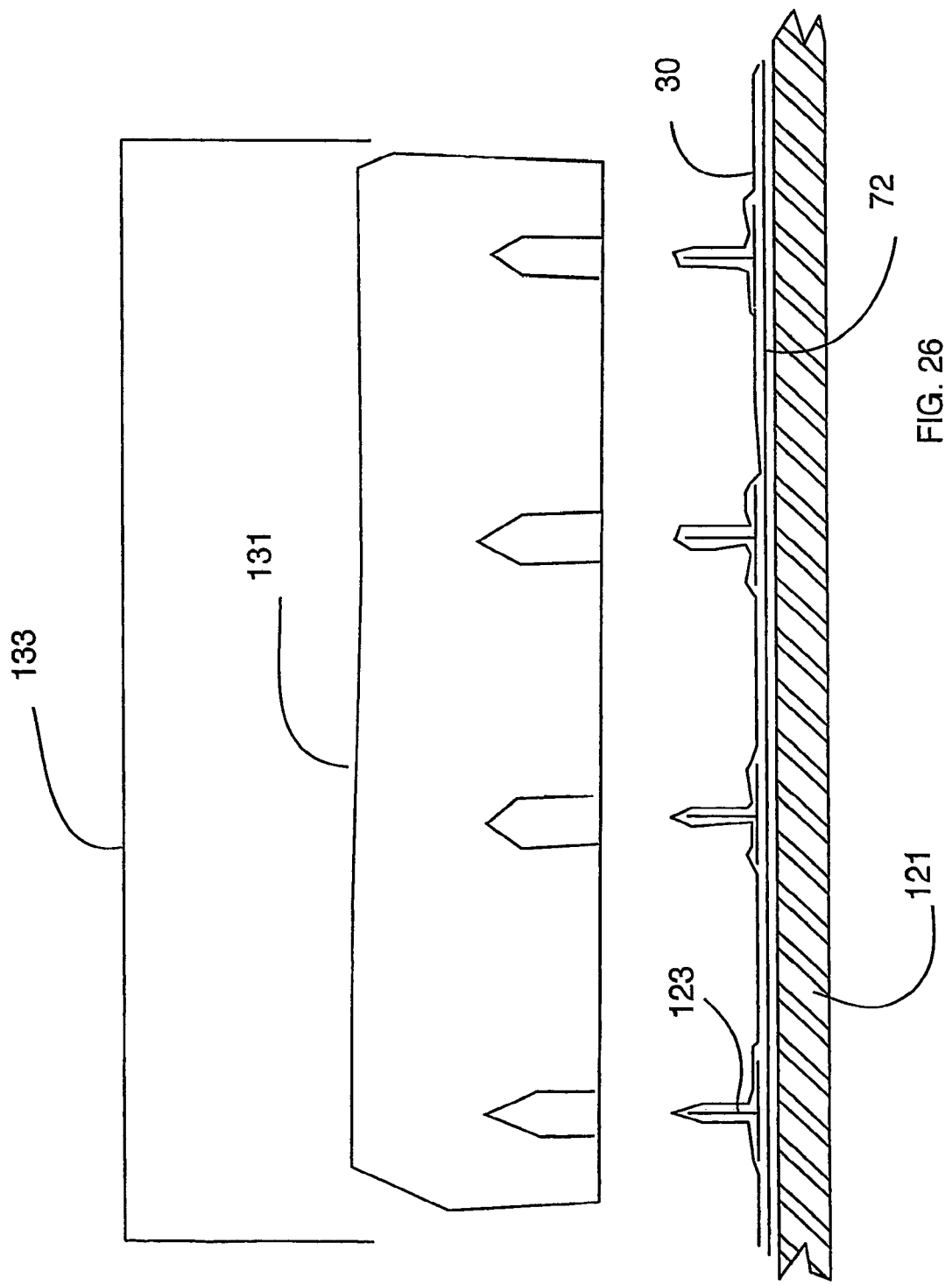

An alternative configuring arrangement is shown in FIG. 26, this arrangement including a bladder bag 131 supportable within a pressure chamber housing 133. The bladder 131 when inflated within the housing provides the chamber wall 132 for the pressure chamber housing 132. The bladder 132 includes a series of channels 135 When the chamber wall 135 is lowered over the mould section 121 supporting the lay-up 72, reinforcement ribs 123 and vacuum film 30, the channels 135 provide a space to accommodate the upstanding portion of the ribs 123. This arrangement provides for improved contact of the chamber wall 135 to the lay-up and ribs 123 during the compression and curing or bonding stage.

The arrangement shown in FIG. 26 utilizes a single bladder 131. It is however also envisaged that the housing 133 accommodate more than one bladder at the same time. Such an arrangement would allow very large components to be produced where the use of a single bladder would be impractical.

Figure 27:
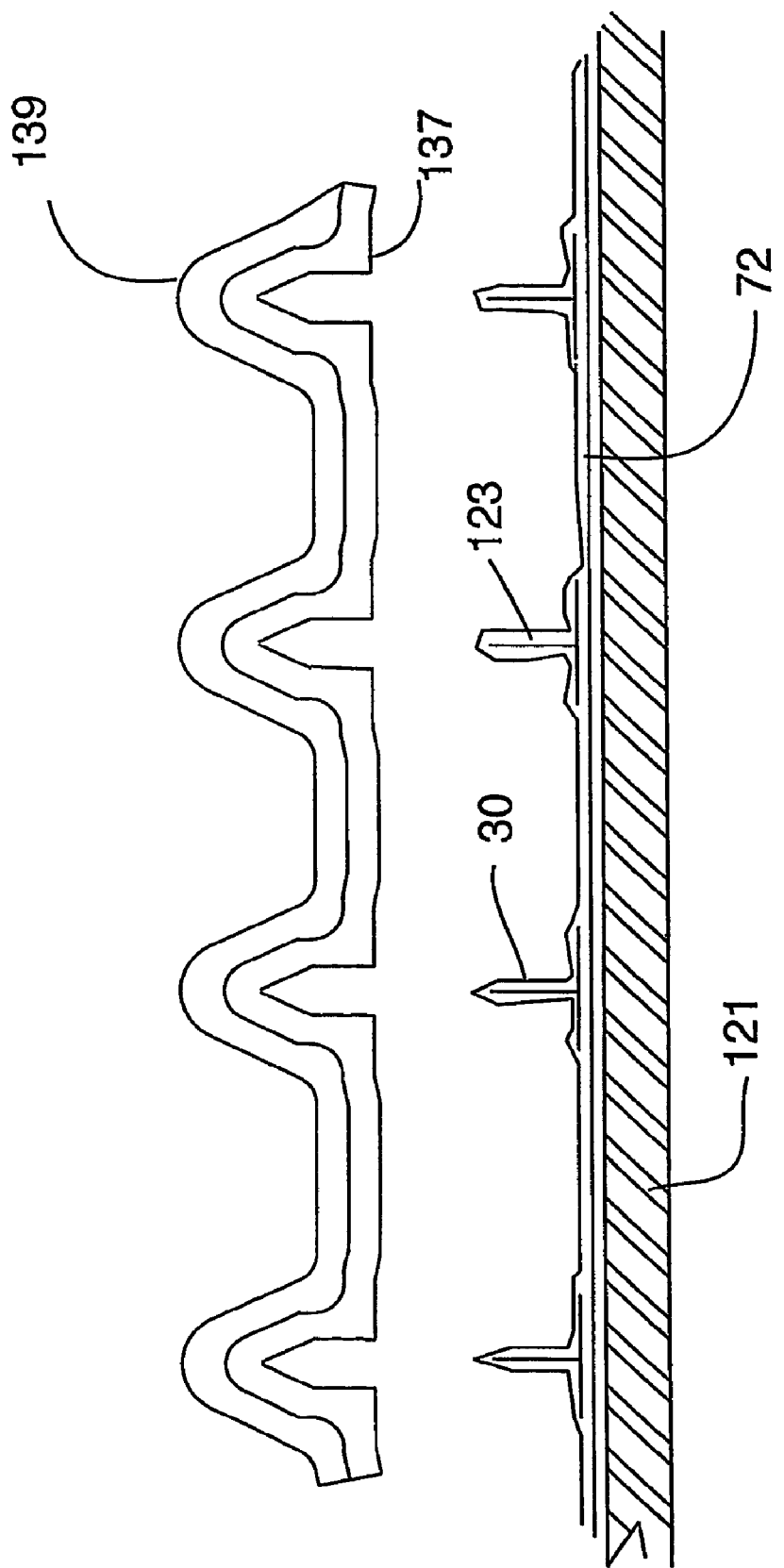

In a further embodiment of the configuring arrangement as shown in FIG. 27, there is shown a relatively narrow in cross-section fluid flow bladder 137 made of elastically deformable material which is shaped to conform to the lay-up 72 supporting the ribs 123. The chamber wall 139 of the pressure chamber can also be configured to conform with the general shape of the fluid flow bladder 137. Fluid is circulated though the fluid flow bladder 137 during the production stage.

Figure 28:
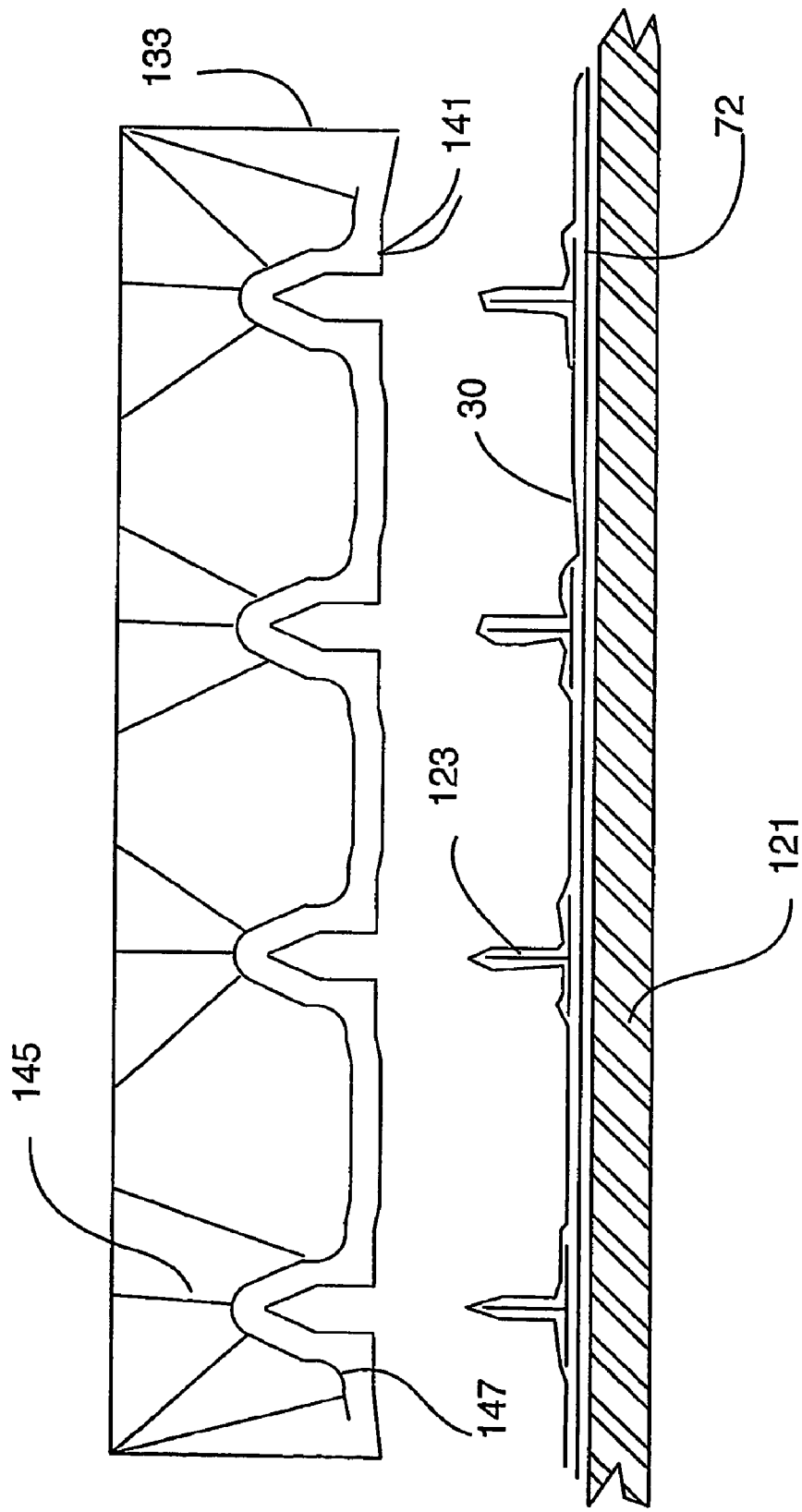

FIG. 28 shows another embodiment of a configuring arrangement which also utilizes a configured chamber wall 141 of a pressure chamber 133. As the chamber wall is formed of elastically deformable material, it can need to be supported to retain its configured shape. Therefore, an internal support frame 145 can be provided within the pressure chamber 133, the support frame 145 having a configured support portion 147. When the pressure chamber 133 is relieved of pressure, the chamber wall 141 can draw back against the support portion 147 of the support frame 147 thereby holding the chamber in its correct general position.

Figure 29:
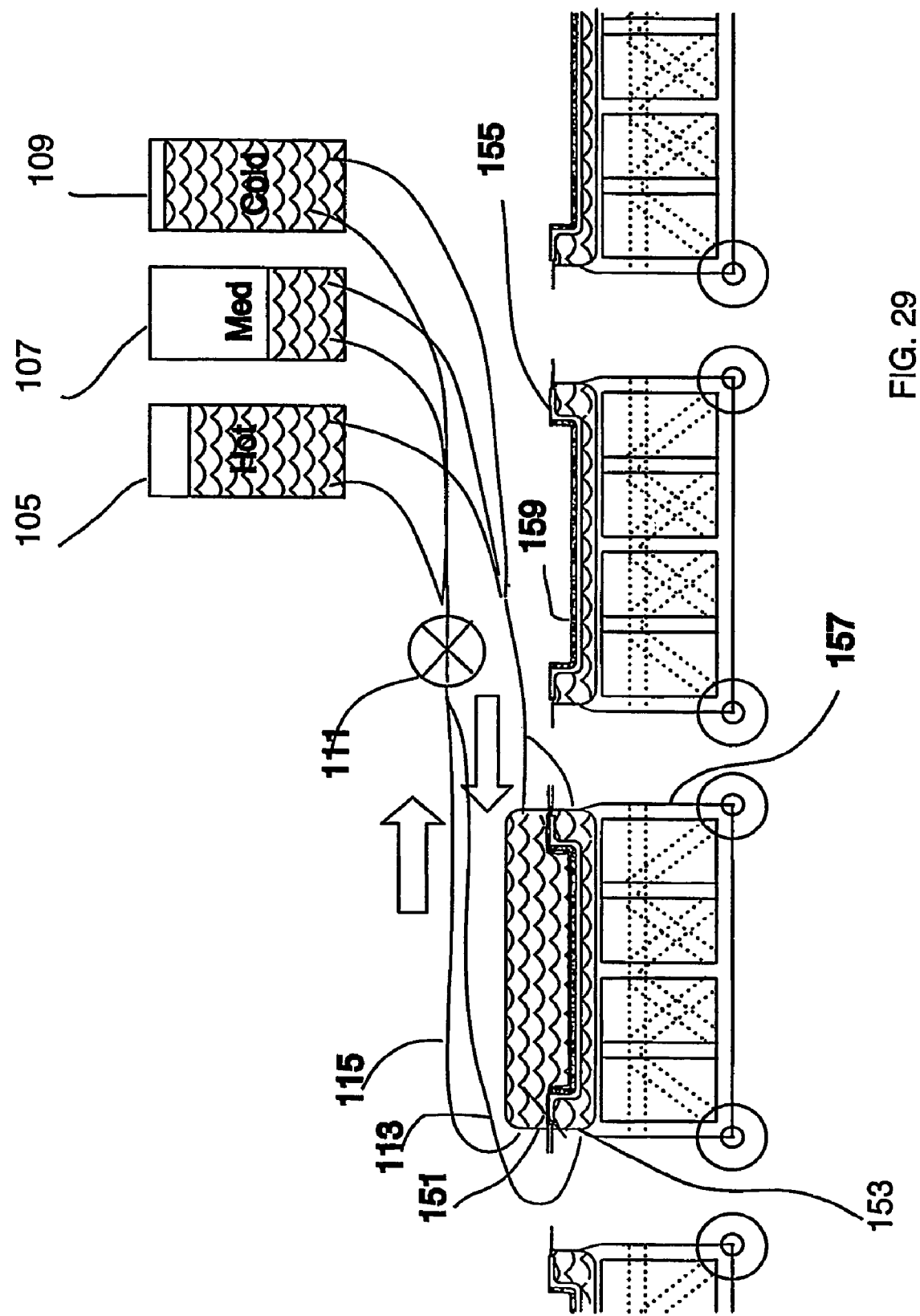
FIGS. 29 to 31 are schematic views of semi-continuous production systems according to the present invention.

In the Applicant's international patent application no. PCT/AU95/00593, there is described a composite or bonded metal production system. This production system could also be adapted for semi-continuous production as shown in FIG. 29. That system utilizes a top pressure chamber 151 having an elastically deformable chamber wall, and a bottom chamber 153 supporting a resiliently mounted mould section 155. Fluid at elevated temperature and pressure can be circulated though both the pressure chambers 151, 153 during the production stage. The fluid can be provided by a fluid circulation system similar to that described in the system shown in FIG. 22.

The production system is adapted for semi-continuous production by providing a plurality of bottom pressure chambers 153, each supported on a trolley 157 to facilitate movement of the bottom pressure chambers 153. A single top pressure chamber 151 is mounted for vertical movement. Therefore, a number of mould sections 155 of the bottom pressure chambers 153 can be prepared to thereby accommodate a composite or bonded metal lay-up 159 while another of the prepared bottom pressure chambers is located under the upper pressure chamber 151. There is therefore no delays in the production process due to the time taken to prepare the mould section for the production stage.

Figure 30:
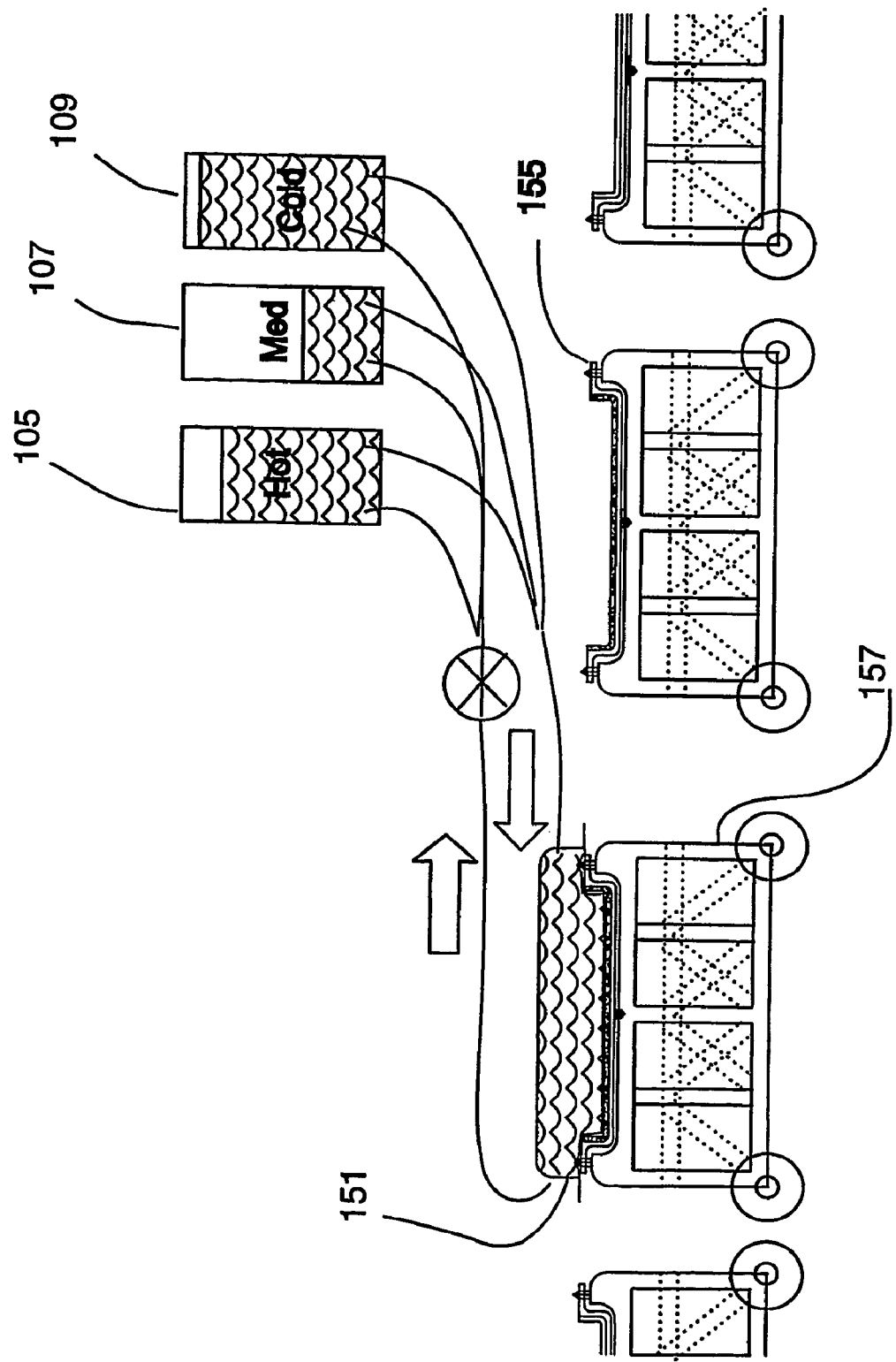
Figure 31:
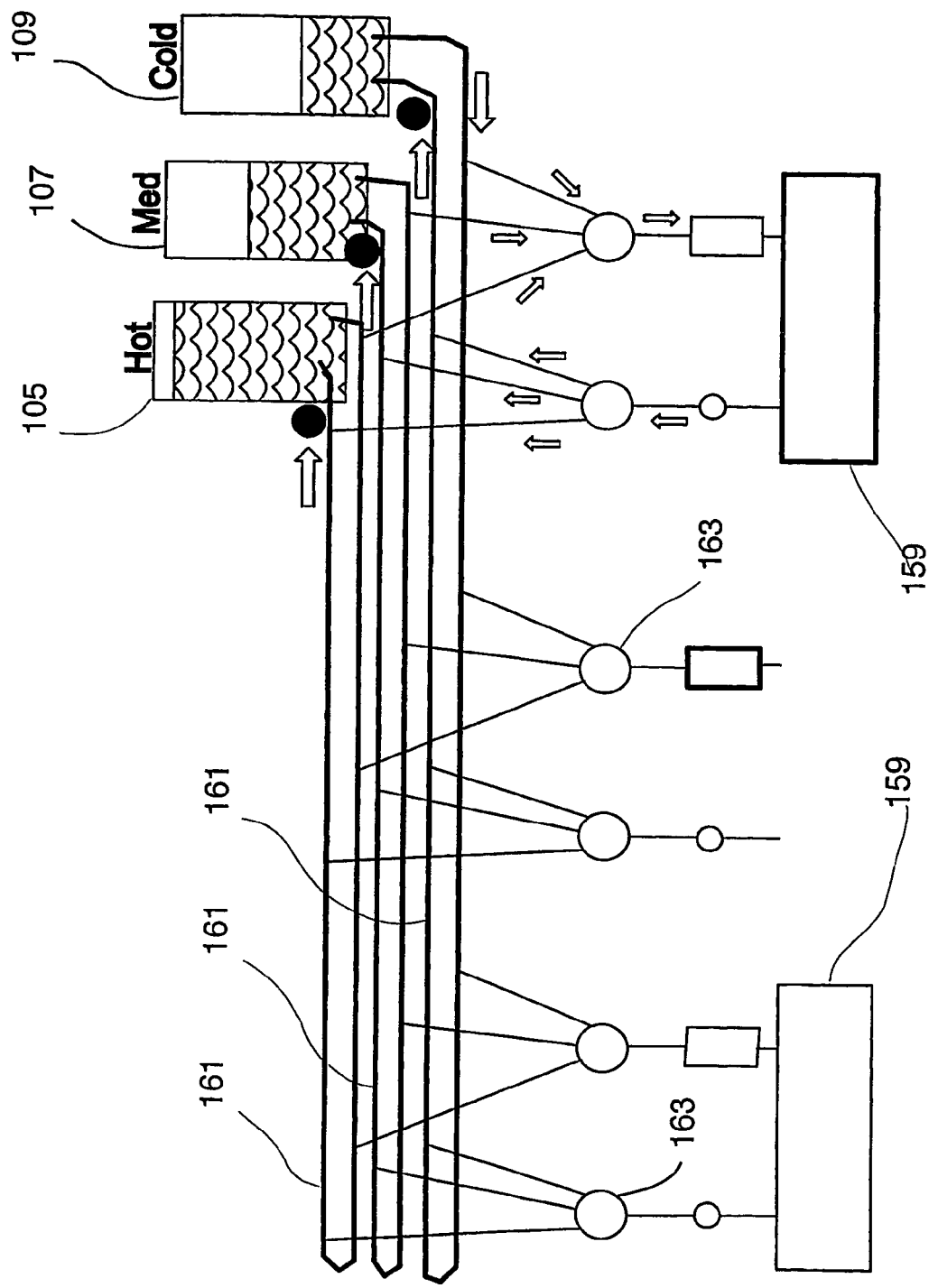

FIG. 30 shows a variation of the semi-continuous production system of FIG. 29, the main difference being that the production system shown in FIG. 22 is used. That system only requires a top pressure chamber 151, the trolleys 157 supporting a rigidly mounted mould section.

In the adaptation of the abovedescribed production systems for mass production, a series of stations can be used, each station supporting a single production system 159. To enable each of these stations to be supplied with circulating fluid, the fluid circulation system described in the applicant's international patent application no. PCT/AU95/00593 can be provided with ring mains 161. Each fluid reservoir 105,107, 109 can be provided with a separate ring mains 161. A fluid supply system 163 is provided at each station to circulation fluid though the production system 163 located at that station. The timing production sequence at each station can be staggered so that there is no excessive withdraw of fluid at any one time from any of the fluid reservoirs. Because the fluid in each fluid reservoir is held at a particular constant temperature, this allows for the immediate supply of fluid at the required temperature by connecting to the appropriate fluid reservoir. It is therefore not necessary to heat fluid because fluid at the required temperature is available at all times when using the fluid circulation system according to the present invention. This also results in the flexibility of the manufacturing and curing phase of the process to commence a cure cycle at any time, that is there is no fixed cure cycle times for start and finish that the mould must wait for.

Figure 32:
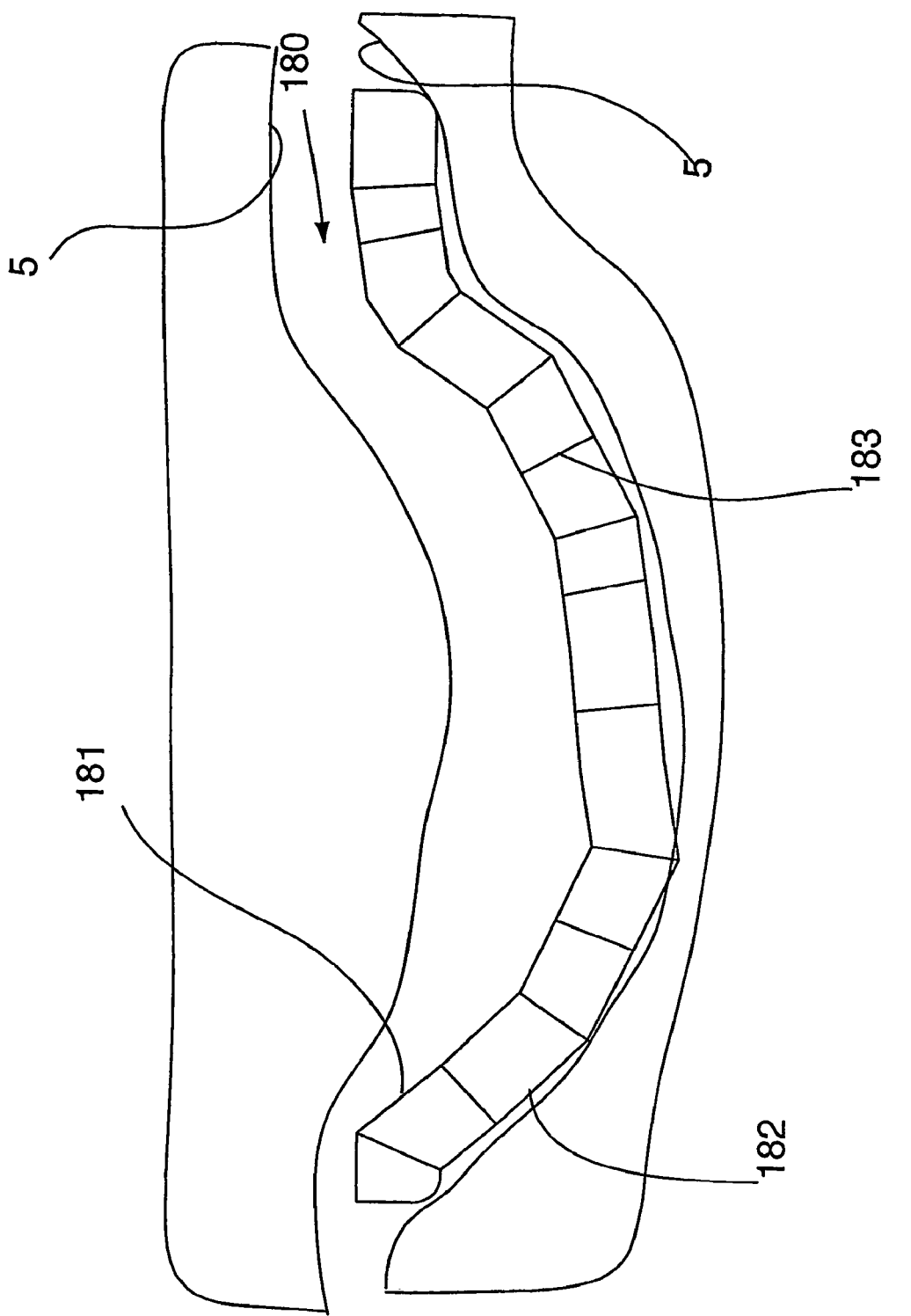
FIG. 32 is a schematic cross-sectional view of a mould section having internal fins.

FIG. 32 shows a reinforced mould section 180 located between two pressure chamber walls 5. This mould section 180 includes an inner mould skin 181 providing the mould cavity, and an outer mould skin 182 on the opposing side of the mould skin 180. The thickness of the inner mould skin 181 is greater than the outer mould skin 182 to provide for dimensional accuracy.

Extending between the mould skins are a series of reinforcement fins 183. These reinforcement fins 183 define box structures within the mould section 180. The resultant mould section is more rigid and yet lighter than conventional single wall mould sections. Furthermore, fluid can be circulated at balanced pressure or slightly higher pressure to the pressure chambers through the box structures of the mould section 180 providing high heat transfer efficiencies for the mould section 180. This is because the reinforcement fins 183 also acts as heating and cooling fins. The outer mould skin 182 can also be provided with outer insulation to reduce heat loss.

The method and system according to the present invention therefore allows for the production of composite and metal components in a semi-continuous process. A major advantage of the production systems according to the present invention is that they provide better utilization of the space in a production facility. For example, where autoclaves are used, space is required to transport and hold the moulds prior to using the autoclave. No such holding space is required for production systems according to the present invention.

Modifications and variations as would be deemed obvious to the person skilled in the art are included within the ambit of the present invention as claimed in the appended claims.

The claims defining the invention are as follows:

1. A system for producing composite or bonded metal components including:
   first and second pressure chambers, each pressure chamber having an elastically deformable chamber wall;
   means for circulating fluid at an elevated temperature and pressure through each said pressure chamber; and at least one mould assembly including at least one separate mould section providing a mould cavity within which a composite or bonded metal lay-up can be located;

wherein when the system is in use, the pressure chambers are held together with the elastically deformable chamber walls located in opposing relation, the at least one mould assembly containing the lay-up being accommodated between the chamber walls while fluid at elevated temperature and pressure is circulated through each pressure chamber such that the lay-up can be compressed and cured or formed.

2. A system according to claim 1, wherein each pressure chamber includes a housing supporting a said elastically deformable chamber wall on a side thereof.

3. A system according to claim 1, wherein each pressure chamber includes an outer support frame supporting a flexible bladder therein, one face of the bladder providing the elastically deformable chamber wall for the pressure chamber.

4. A system according to claim 1, wherein the mould assembly includes a single mould section for supporting the lay-up.

5. A system according to claim 1, wherein the mould assembly includes a pair of said mould sections, the lay-up being located therebetween.

6. A method of producing composite or bonded metal components including:
locating a composite or bonded metal lay-up in a mould cavity of a mould assembly;
locating the mould assembly together with the lay-up between first and second pressure chambers, each pressure chamber having an elastically deformable chamber wall, the chamber walls being located in opposing relation with the mould assembly located therebetween; and
circulating a fluid at an elevated pressure and temperature though each pressure chamber such that the composite or bonded metal lay-up is compressed and cured or formed.

7. A method according to claim 6, including circulating the fluid through each pressure chamber at substantially the same pressure.

8. A method according to claim 6, wherein a single mould section is used, including locating a vacuum bag over the mould section to apply an initial compression of the lay-up therein.

9. A system for producing composite or bonded metal components including:
first and second pressure chambers, each pressure chamber having an elastically deformable chamber wall;
at least one mould assembly including a mould section having opposing faces, one of said mould section faces providing a mould cavity within which a composite or bonded metal lay-up can be located, the at least one mould assembly further including a fluid flow chamber being provided adjacent an opposing said mould section face such that fluid circulated through the fluid flow chamber is in direct contact with at least a substantial portion of the opposing mould section face; and
means for circulating fluid at an elevated temperature and pressure through each said pressure chamber and through the fluid flow chamber;
wherein when the system is in use, the pressure chambers are held together with the elastically deformable chamber walls located in opposing relation, the at least one mould assembly containing the lay-up being accommodated between the chamber walls while fluid at elevated temperature and pressure is circulated through each pressure chamber and the fluid flow chamber of the at least one mould assembly such that the lay-up can be compressed and cured or formed.

10. A system according to claim 9, further including a top flow control chamber locatable over the mould cavity when the mould assembly is located between the pressure chambers, wherein when the system is in use, fluid at elevated temperature and pressure is circulated through the top fluid flow chamber.

11. A system according to claim 10, wherein the top fluid flow chamber includes a bladder formed of elastically deformable material, a face of the bladder being configured to at least generally follow the shape of the mould cavity when the fluid is circulated therethrough.

12. A method of producing composite or bonded metal components including:
locating a composite or bonded metal lay-up in a mould cavity of a mould assembly including a mould section, the mould section including a face opposing the mould cavity,
with a fluid flow chamber being located adjacent said opposing mould section face;
locating the mould section together with the lay-up between the first and second pressure chambers, each pressure chamber having an elastically deformable chamber wall, the chamber walls being located in opposing relations with the mould sections with said lay-up located therebetween, and
circulating fluid at an elevated temperature and pressure through each pressure chamber and the fluid flow chamber such that the composite or bonded metal lay-up is compressed and cured or formed.

13. A method according to claim 12, including cycling the fluid temperature through the fluid flow chamber while maintaining a relatively constant fluid temperature within the pressure chambers.

14. A method according to claim 12, further including locating a top fluid flow chamber over the mould cavity, and circulating fluid at an elevated temperature and pressure through the top fluid chamber.

15. A method according to claim 14, including cycling the fluid temperature within the top fluid flow chamber.

16. A system for producing a composite or bonded metal components including:
first and second pressure chambers, each chamber having an elastically deformable chamber wall;
means for circulating fluid at an elevated temperature and pressure through each said pressure chamber; and
at least one mould assembly including a mould section providing a mould cavity within which a composite or bonded metal lay-up can be located,
location means for locating the at least one mould assembly in a fixed position, the pressure chamber being supported about the at least one mould assembly in a floating relation relative thereto;
wherein when the system is in use, the pressure chambers are held together with the elastically deformable walls located in opposing relation, the at least one mould assembly containing said lay-up being accommodated between the chamber walls while fluid at elevated temperature and pressure is circulated through each pressure chamber such that the lay-up can be compressed and cured or formed.

17. A system according to claim 16, wherein the location means is in the form of a support frame including support members extending therefrom for supporting the mould assembly, the support members extending through at least one of said pressure chambers.

18. A method of producing composite or bonded metal components including:

locating a composite or bonded metal lay-up in the mould cavity of a mould assembly;

locating the mould assembly together with the composite or bonded metal lay-up between first and second pressure chambers at least substantially filled with fluid, each pressure chamber having an elastically deformable chamber wall, the chamber walls being located in opposing relation with the mould assembly located therebetween;

supplying resin to the mould assembly and through the lay-up located therein; collecting the overflow of resin from the mould assembly for subsequent supply to another mould assembly; and circulating fluid at an elevated pressure and temperature through each pressure chamber such that the lay-up is compressed and cured or formed.

19. A method according to claim 18, including sequentially collecting and supplying said overflow of resin to one or more further mould assemblies.

20. A method according to claim 18, wherein the mould assembly is positioned in an inclined position.

21. A method for producing composite or bonded metal components including:

preparing and locating a composite or bonded metal lay-up in the mould cavity of a plurality of mould assemblies;

locating one or more mould assemblies between two separated pressure chambers, each pressure chamber having an elastically deformable chamber wall, bringing the pressure chambers together in a production stage such that the or each mould assembly is located between the chamber walls of the pressure chambers;

circulating fluid at elevated temperature and pressure through each pressure chamber during said production stage to thereby compress and cure or form the component;

removing the or each mould assembly from between the pressure chambers; and replacing the or each-mould assembly with a further one or more mould assembly accommodating a lay-up for a following production stage.

22. A method according to claim 21, wherein the circulating fluid is supplied by a fluid circulation system including a plurality of fluid reservoirs respectively containing fluid at differing temperatures, each fluid reservoir being provided with a separate ring means to enable fluid from each said reservoir to be supplied to a plurality of stations, and fluid supply means at each station for supplying fluid from each ring means to a said pressure chamber located at the station.

23. A mould section of a mould assembly for a production system according to claim 1, wherein the mould section includes an inner mould skin for providing a mould cavity, an opposing outer mould skin, and a plurality of reinforcement fins interconnecting said inner and outer mould skins, wherein fluid can be circulated through the mould section.

\* \* \* \* \*